US010832316B2

(12) United States Patent
Castiglione et al.

(10) Patent No.: US 10,832,316 B2
(45) Date of Patent: *Nov. 10, 2020

(54) FINANCIAL MODELING SYSTEMS AND METHODS

(71) Applicant: Leap System, Inc., Nashville, TN (US)

(72) Inventors: Robert Castiglione, Whitehouse Station, NJ (US); Christian Castiglione, Whitehouse Station, NJ (US)

(73) Assignee: Leap System, Inc., Nashville, TN (US)

( * ) Notice: Subject to any disclaimer, the term of this patent is extended or adjusted under 35 U.S.C. 154(b) by 189 days.

This patent is subject to a terminal disclaimer.

(21) Appl. No.: 16/154,039

(22) Filed: Oct. 8, 2018

(65) Prior Publication Data
US 2019/0043123 A1 Feb. 7, 2019

Related U.S. Application Data

(63) Continuation of application No. 12/408,643, filed on Mar. 20, 2009, now Pat. No. 10,096,061.

(60) Provisional application No. 61/070,295, filed on Mar. 20, 2008, provisional application No. 61/070,167, filed on Mar. 20, 2008, provisional application No. 61/070,361, filed on Mar. 20, 2008, provisional application No. 61/070,147, filed on Mar. 20, 2008, provisional application No. 61/070,385, filed on Mar. 20, 2008, provisional application No. 61/070,294, filed on Mar. 20, 2008.

(51) Int. Cl.
G06Q 40/00 (2012.01)
(52) U.S. Cl.
CPC .................. G06Q 40/00 (2013.01)

(58) Field of Classification Search
CPC ...................................... G06Q 40/00
USPC ...................................... 705/35
See application file for complete search history.

(56) References Cited

U.S. PATENT DOCUMENTS 6,430,542 B1 * 8/2002 Moran ............... G06Q 30/02
705/35
6,938,027 B1 8/2005 Barritz et al.
(Continued)

OTHER PUBLICATIONS

Participative Web: User Created Content (Year: 2007).*

Primary Examiner — Bruce I Ebersman
(74) Attorney, Agent, or Firm — Troutman Pepper Hamilton Sanders LLP; Christopher C. Close, Jr.; Micah B. Hensley

(57) ABSTRACT

Systems and methods for providing financial modeling are provided. A financial modeling method according to the present invention can comprise receiving comprehensive financial data relating to an entity. The financial data can be categorized into a plurality of financial components, which can comprise a protection component, and savings component, and a growth component. An additional step can comprise analyzing the financial data, along with a set of assumptions, to create a financial model based on the plurality of financial components. The method can display a graphical representation of the financial model, and the graphical representation can illustrate an application of one or more of the financial components to the financial data. An update to the financial data or the assumptions can be received and dynamically incorporated into the graphical representation.

20 Claims, 31 Drawing Sheets

(56) References Cited

U.S. PATENT DOCUMENTS

| | | |
|---|---|---|
| 7,394,472 B2 | 7/2008 | Oliveira et al. |
| 7,792,729 B2 | 9/2010 | Caballero et al. |
| 8,195,739 B2 | 6/2012 | Bernardin et al. |
| 2004/0030589 A1 | 2/2004 | Leisher et al. |
| 2004/0267551 A1 | 12/2004 | Yadav |
| 2004/0267651 A1 | 12/2004 | Jenson et al. |
| 2005/0216316 A1 | 9/2005 | Brisbois et al. |
| 2006/0287892 A1 | 12/2006 | Jones et al. |
| 2007/0016434 A1* | 1/2007 | Oppenheimer ........ G06Q 10/06 705/7.32 |
| 2007/0244777 A1* | 10/2007 | Torre ................. G06Q 40/06 705/35 |
| 2008/0313345 A1 | 12/2008 | Bernardin et al. |

* cited by examiner

FINANCIAL MODELING SYSTEMS AND METHODS

CROSS-REFERENCE TO RELATED APPLICATIONS

This Application claims priority to and benefit under 35 U.S.C. § 120 of U.S. patent application Ser. No. 12/408,643, filed Mar. 20, 2009, which claims priority to and benefit under 35 U.S.C. § 119(e), of U.S. Provisional Application Ser. Nos. 61/070,147, 61/070,167, 61/070,294, 61/070,295, 61/070,361, and 61/070,385, all of which were filed on Mar. 20, 2008. The entire contents and substance of each above-listed application are hereby incorporated by reference.

BACKGROUND

1. Technical Field

Various embodiments of the present invention relate to financial models and, more particularly, to systems and methods for modeling or simulating financial data.

2. Description of Related Art

Conventionally, financial planning is based on meeting specific, predetermined goals without regard to an overall scientific picture of an entity's financial circumstances. To meet the predetermined goals, financial planners or analysts generally use trial and error approaches to determine which financial decisions are likely to be most successful in reaching the goals. Accordingly, because trial and error approaches tend to be based on little more than deductive reasoning, resulting financial decisions are not based on scientific study of an entity's finances. Many financial plans fail because they are too heavily focused on linear mathematical calculations that are based on a singular or one dimensional task. Consequently, when creating a financial plan via conventional methods, initial targets and goals are likely flawed. Additionally, it can be expected that not all factors will be properly considered in attempting to meet those targets and goals.

In the majority of financial plans, an objective is identified and then quantified into a specific future financial need. For example, a couple may decide that they want to send their child to an expensive private university. It may then be determined that couple will need to save approximately $140,000 in the next eighteen years. Next, a deficiency study is undertaken by subtracting the quantification of existing financial resources from the future need. Finally, one or more financial plans can be undertaken to overcome the deficiency. Continuing the previous example, if the couple's current savings plan would enable them to save only $75,000 in the next eighteen years, they would need to develop a new savings plan, or supplement their current savings plan to make up the additional required $65,000. Various financial products would be recommended to the couple to assist them in saving the additional required funds. Although the above example is simplified, this process of analyzing the couple's finances is representative of a conventional financial deductive process, which is too one-dimensional to provide an accurate picture of an entity's complete financial situation. Such deductive reasoning is further inaccurate and flawed for failing to apply real-life erosionary properties of money to a financial plan.

To institute financial order and control, the financial industry introduced a balance sheet. The balance sheet, however, fails to provide a solution to the problem of one-dimensional financial planning. The balance sheet merely provides a list of a person's assets and liabilities, and subtracts the liabilities from the assets to produce the person's estimated net worth. As with other financial tools, however, balance sheets do not offer a scientific approach to finances. Balance sheets can only linearly quantify net worth. Balance sheets cannot provide consumers with information regarding effectiveness, efficiency, predictability, or verification of financial decisions.

Therefore, there is a need for a financial tool to effectively model an entity's financial performance. Preferably, such a financial tool can aggregate multiple financial products to provide a complete financial assessment. Further preferably, the financial tool can provide a visual representation to enable users to better understand the complete financial assessment. It is to such a financial tool that embodiments of the present invention are directed.

SUMMARY

Exemplary embodiments of the present invention may include financial modeling systems and methods. A financial modeling system according to the present invention can be executed, at least partially, through a financial modeling application. The financial modeling application can comprise a local input unit, a local database, a selection unit, a compartmentalization unit, and a simulation unit.

The local input unit can receive financial data relating to an entity. Preferably, such financial data is comprehensive and comprises responses to a questionnaire prompting financial details of the entity. The local input unit can receive such data and transfer it into the local database.

The selection unit can display a list of entities for which the system maintains financial data. The selection unit can additionally receive a user's selection of one of such entities. This selection can initiate modeling of financial data associated with the selected entity.

The compartmentalization unit can categorize the selected entity's financial data into a plurality of financial components. The financial components can comprise, for example, a protection component, a savings component, and a growth component. Each component can be further subdivided into a plurality of sub-components, which can be arranged within the components in a predetermined and organized manner.

The simulation unit can model the financial data. Such modeling can include, for example, modeling all or some of the components or sub-components, modeling of the entity's present financial position, simulating changes in the entity's financial position, and simulating potential financial futures of the entity.

The above units can communicate with one another and exchange data for operation of the financial modeling system These and other objects, features, and advantages of the financial modeling systems and methods will become more apparent upon reading the following specification in conjunction with the accompanying drawing figures.

BRIEF DESCRIPTION OF THE FIGURES

FIGS. 3A-3E illustrate segments of a questionnaire of the financial modeling system, according to an exemplary embodiment of the present invention.

FIG. 6B illustrates a guideline review of the sub-component of FIG. 6A, according to an exemplary embodiment of the present invention.

FIGS. 10A-10I illustrate the simulation of the money move of FIG. 9 from the first sub-component to the second sub-component of the financial modeling system, according to an exemplary embodiment of the present invention.

DETAILED DESCRIPTION

Figure 1:
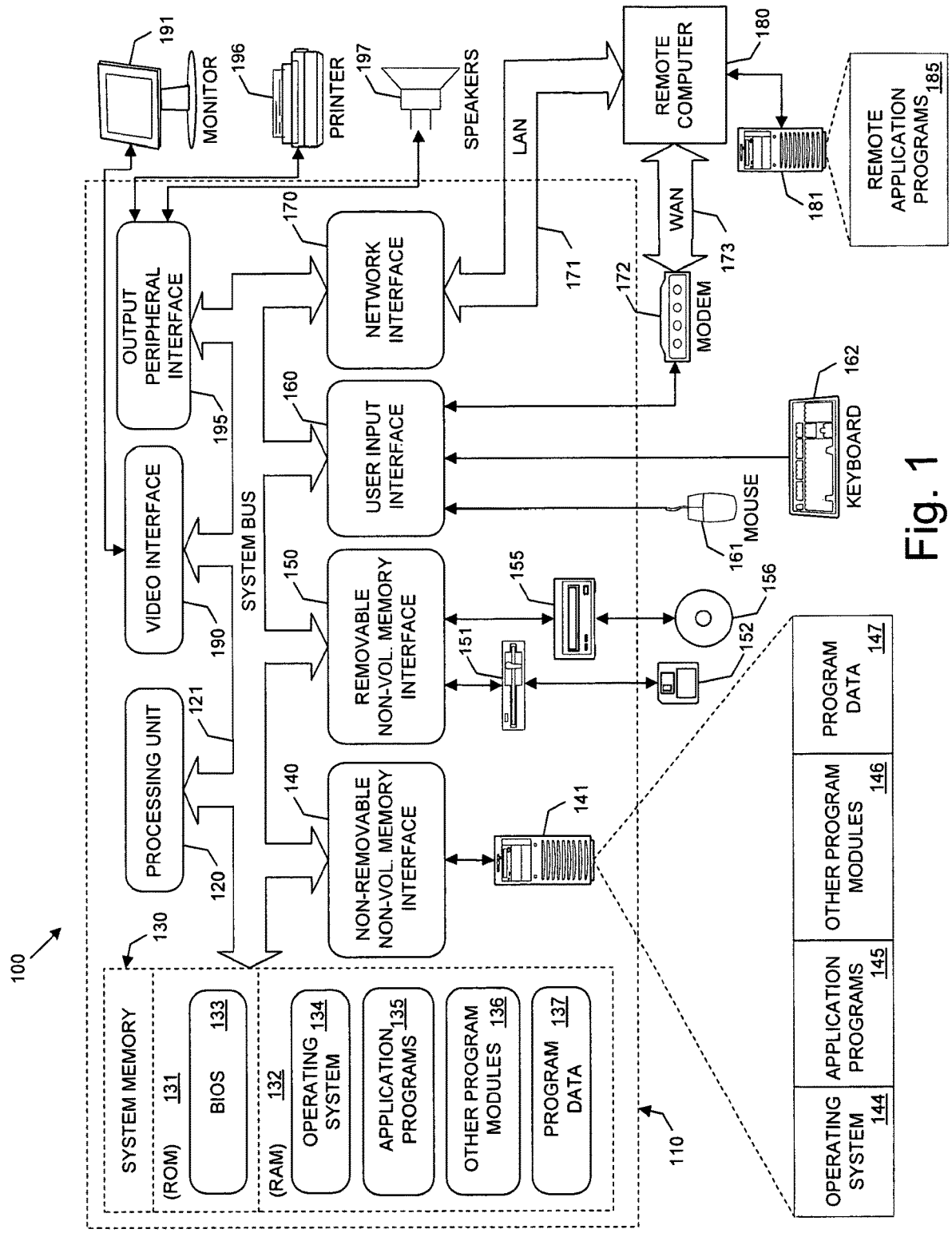
FIG. 1 illustrates a computing environment for a financial modeling system, according to an exemplary embodiment of the present invention.

To facilitate an understanding of the principles and features of the present invention, various illustrative embodiments are explained below. Exemplary embodiments of the invention comprise systems and methods for modeling financial data. In particular, embodiments of the systems and methods are described in the context of modeling a person's complete financial position in a computing environment. Embodiments of the invention, however, are not limited to this context. Rather, embodiments of the invention may be utilized to model portions or segments of financial circumstances of various entities. Further, embodiments of the invention may be utilized to model various complex circumstances, which may or may not have financial components.

The elements described hereinafter as making up various aspects of the invention are intended to be illustrative and not restrictive. Many suitable elements that would perform the same or similar functions as elements described herein are intended to be embraced within the scope of the present financial modeling system. Such other elements not described herein may include, but are not limited to, for example, elements developed after development of the invention.

In an exemplary embodiment, the financial modeling system may receive comprehensive financial data from a user. Such financial data may be received, for example, directly from a financial institution via aggregation technology, direct connection, or download from a web server.

After receiving the financial data, the financial modeling system may provide a visual and multi-dimensional tool for modeling and assessing an entity's financial situation. The system may automatically incorporate the financial data into a financial model, which may comprise a plurality of financial components. A graphical representation of the financial model may illustrate either a select set of the financial components of the entity's financial position, or a complete picture of the entity's financial position comprising all applicable components. The financial model may additionally simulate a progression of the entity's financial position into the future. Accordingly, the entity can view the model and effectively plan for the future from a financial standpoint.

Referring now to the figures, wherein like reference numerals represent like parts throughout the views, various embodiments of the financial modeling systems and methods will be described in detail.

I. Exemplary Environment of Embodiments of the System

FIG. 1 illustrates an example of a suitable computing system 100, such as a computer, on which embodiments of the invention may be implemented. The computer 100 is only one example of a suitable environment for embodiments of the invention and is not intended to suggest any limitation as to the scope of use or functionality of the invention.

Exemplary embodiments of the financial modeling system 200 (FIG. 2) may be operational with numerous other general purpose or special purpose computing system environments or configurations. Examples of well known computing systems, environments, or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Exemplary embodiments of the financial modeling system 200 may be described in a general context of computer-executable instructions, such as one or more applications or program modules, stored on a computer-readable medium and executed by a computer processing unit. Generally, program modules may include routines, programs, objects, components, or data structures that perform particular tasks or implement particular abstract data types. Embodiments of the system 200 may also be practiced in distributed computing environments where tasks are performed by remote processing devices that are linked through a communications network. In a distributed computing environment, program modules may be located in both local and remote computer storage media, including memory storage devices.

With reference to FIG. 1, components of the computer 100 may comprise, without limitation, a processing unit 120 and a system memory 130. A system bus 121 may couple various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 100 may include a variety of computer-readable media. Computer-readable media may comprise various available media accessible by the computer 100, including both volatile and nonvolatile, removable and non-removable media. For example, and not limitation, computer-readable media may comprise computer storage media and communication media. Computer storage media includes both volatile and nonvolatile, removable and non-removable media implemented in any method or technology for storage of information such as computer readable instructions, data structures, program modules or other data. Computer storage media may include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store data accessible by the computer 100.

Communication media can typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For, and not limitation, communication media includes wired media such as a wired network or direct-wired connection, and wireless media such as acoustic, RF, infrared and other wireless media. Combinations of any of the above can also be included within the scope of computer readable media.

The system memory 130 can comprise computer storage media in the form of volatile and/or nonvolatile memory such as read only memory (ROM) 131 and random access memory (RAM) 132. A basic input/output system 133 (BIOS), containing the basic routines that help to transfer information between elements within the computer 100, such as during start-up, can typically be stored in the ROM 131. The RAM 132 typically contains data and/or program modules that are immediately accessible to and/or presently in operation by the processing unit 120. For example, and not limitation, FIG. 1 illustrates operating system 134, application programs 135, other program modules 136, and program data 137.

The computer 100 can also include other removable or non-removable, volatile or nonvolatile computer storage media. By way of example only, FIG. 1 illustrates a hard disk drive 141 that can read from or write to non-removable, nonvolatile magnetic media, a magnetic disk drive 151 for reading or writing to a non-volatile magnetic disk 152, and an optical disk drive 155 for reading or writing to a non-volatile optical disk 156, such as a CD ROM or other optical media. Other computer storage media that can be used in the exemplary operating environment can include magnetic tape cassettes, flash memory cards, digital versatile disks, digital video tape, solid state RAM, solid state ROM, and the like. The hard disk drive 141 can be connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above, and illustrated in FIG. 1, can provide storage of computer readable instructions, data structures, program modules and other data for the computer 100. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137.

A web browser application program 135, or web client 124, can be stored on the hard disk drive 141 or other storage media. The web client 124 can comprise an application program 135 for requesting and rendering web pages 126, such as those created in Hypertext Markup Language ("HTML") or other types of markup languages. The web client 124 can be capable of executing client side objects, as well as scripts through the use of a scripting host. The scripting host executes program code expressed as scripts within the browser environment. Additionally, the web client 124 can execute web application programs 135, which can be embodied in web pages 126.

A user may enter commands and information into the computer 100 through input devices such as a keyboard 162 and pointing device 161, commonly referred to as a mouse, trackball, or touch pad. Other input devices (not shown) may include a microphone, joystick, game pad, satellite dish, scanner, electronic white board, or the like. These and other input devices are often connected to the processing unit 120 through a user input interface 160 coupled to the system bus 121, but may be connected by other interface and bus structures, such as a parallel port, game port, or a universal serial bus (USB). A monitor 191 or other type of display device can also be connected to the system bus 121 via an interface, such as a video interface 190. In addition to the monitor, computers may also include other peripheral output devices such as speakers 197 and a printer 196. These can be connected through an output peripheral interface 195.

The computer 100 can operate in a networked environment using logical connections to one or more remote computers, such as a remote computer 180. The remote computer 180 may be a personal computer, a server, a router, a network PC, a peer device, or other common network node, and can includes many or all of the elements described above relative to the computer 100, including a memory storage device 181. The logical connections depicted in FIG. 1 include a local area network (LAN) 171 and a wide area network (WAN) 173, but can also include other networks.

When used in a LAN networking environment, the computer 100 can be connected to the LAN 171 through a network interface or adapter 170. When used in a WAN networking environment, the computer 100 can include a modem 172 or other means for establishing communications over the WAN 173, such as the internet. The modem 172, which can be internal or external, can be connected to the system bus 121 via the user input interface 160 or other appropriate mechanism. In a networked environment, program modules depicted relative to the computer 100 can be stored in the remote memory storage device. For example, and not limitation, FIG. 1 illustrates remote application programs 185 as residing on memory device 181. It will be appreciated that the network connections shown are exemplary and other means of establishing a communications link between the computers can be used.

II. Overview of Embodiments of the System

Figure 2:
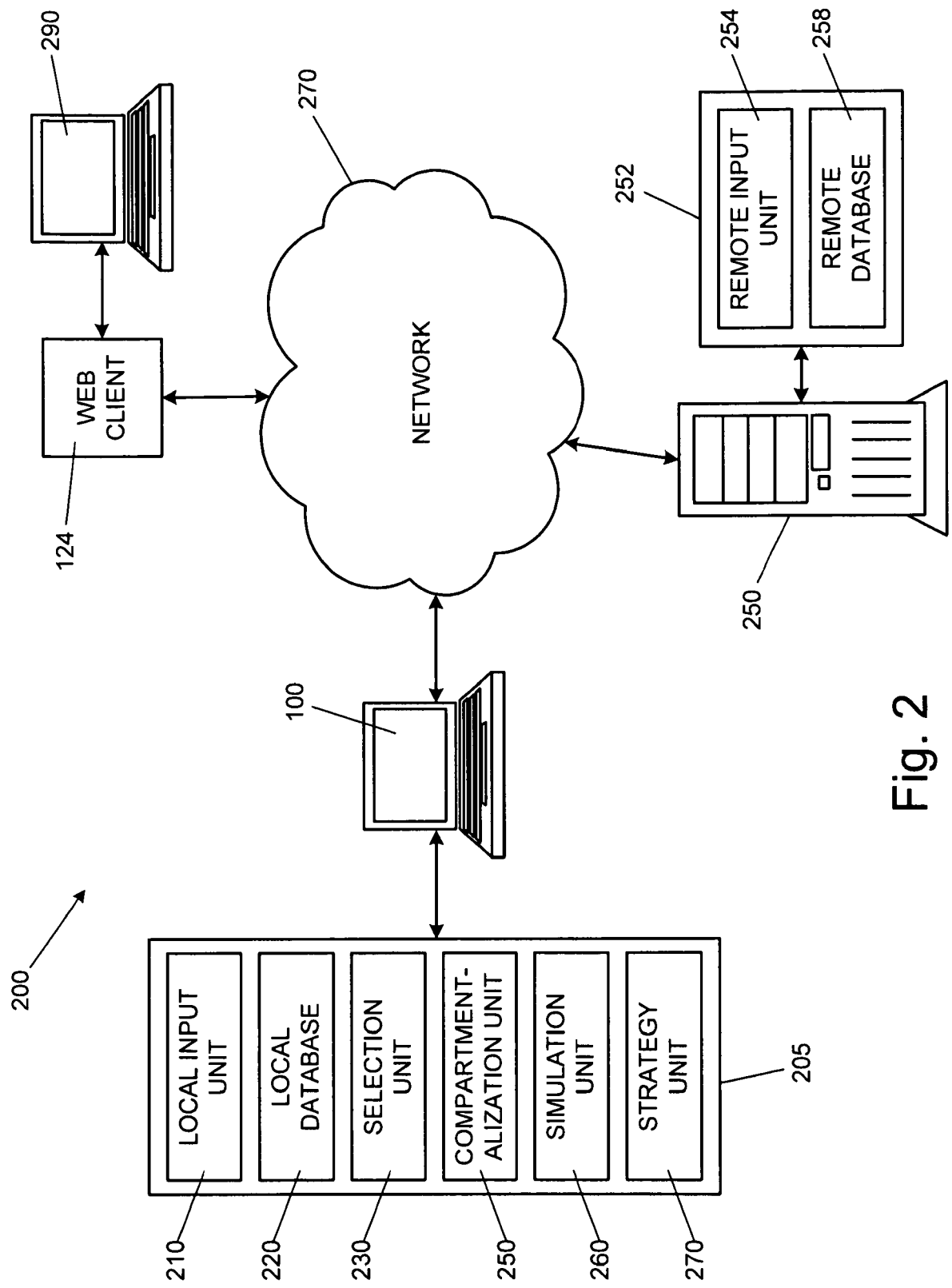
FIG. 2 illustrates a diagram of the financial modeling system, according to an exemplary embodiment of the present invention.

FIG. 2 illustrates a diagram of an exemplary embodiment of the financial modeling system 200, which can be implemented on the computer 100 in whole or in part. The financial modeling system 200 can comprise one or more components that can be executable on the computer 100, a remote server 250, or a combination of both. If a server 250 is included in the financial modeling system 200, the server 250 and the computer 100 can be in communication, either directly or over a network. Such network 270 can be, for example, and not limitation, the internet or a local area network.

The computer 100 can be local to a user of the financial modeling system 200, and can execute a financial modeling application 205. The local computer 100 may locally store computer-readable instructions for execution of the financial modeling application 205. Alternatively, however, the financial modeling application 205 may be a web-based application. In that case, the server 250 may store computer-readable instructions for operation of the financial modeling application 205. The local computer 100 may run the financial modeling application 205 through interaction with the server 250. Such interaction may, but need not, occur through use of a web client 124 running at the local computer 100.

The server 250 can comprise the same or similar components as those included in the computer 100, as described above. The server 250, however, can be configured to execute server-side processes and, in some embodiments, can service a financial modeling website for the system 200. The server 250 can comprise one or more server-side modeling applications 252 for server-side operation of the financial modeling system 200.

The financial modeling application 205 and the server-side modeling application 252 can each comprise, or be in communication with, one or more units configured to execute processes of the financial modeling system 200. The units can be one or more modules, files, applications, devices, or combinations or portions thereof. Units of the financial modeling application 205 can include, for example, a local input unit 210, a local database 220, a selection unit 230, a compartmentalization unit 250, a simulation unit 260, and a strategy unit 270. Units of the server-side application 252 can include, for example, a remote input unit 254 and a remote database 258. The various units of the financial modeling application 205 and the server-side modeling application 252 can be in communication with one another for operation of the financial modeling system 200.

In an exemplary embodiment of the financial modeling system 200, a remote computer 290 may access the system 200 through the network. The remote computer 290 may have the same or similar components as the first (local) computer 100, as described above. The remote computer 290, however, need not run or be in direct communication with an instance of the financial modeling application 205. Instead, the remote computer 290 can communicate with the first computer 100 or the server 250 through the network 270. Such communications can, but need not, occur through use of a web client 124 at the remote computer 290.

A. Local and Remote Input Units and Databases

The local input unit 210 and the remote input unit 254 of the financial modeling system 200 can be configured to receive data from a user of the system 200. Preferably, such data comprises comprehensive financial data, but can alternatively comprise limited financial data or various types of data the user desires to be modeled. In some embodiments of the financial modeling system 200, the data can be received via a scanned document or document image. In that case, the local input unit 210 can perform optical character recognition or otherwise translate the document image into manipulatable data.

The local input unit 210 can receive the data by various means. For example, and not limitation, the data can be entered directly into the local computer 100 running the financial modeling application 205. In an exemplary embodiment, the local input unit 210 can present the user with a questionnaire regarding the details of an entity's financial situation. Preferably, the questionnaire is comprehensive, enabling the user to enter comprehensive information regarding the entity's financial situation. In an alternate exemplary embodiment, the local input unit 210 can receive the data over the network 270 from the server 250 or from a financial institution.

Figure 3A:
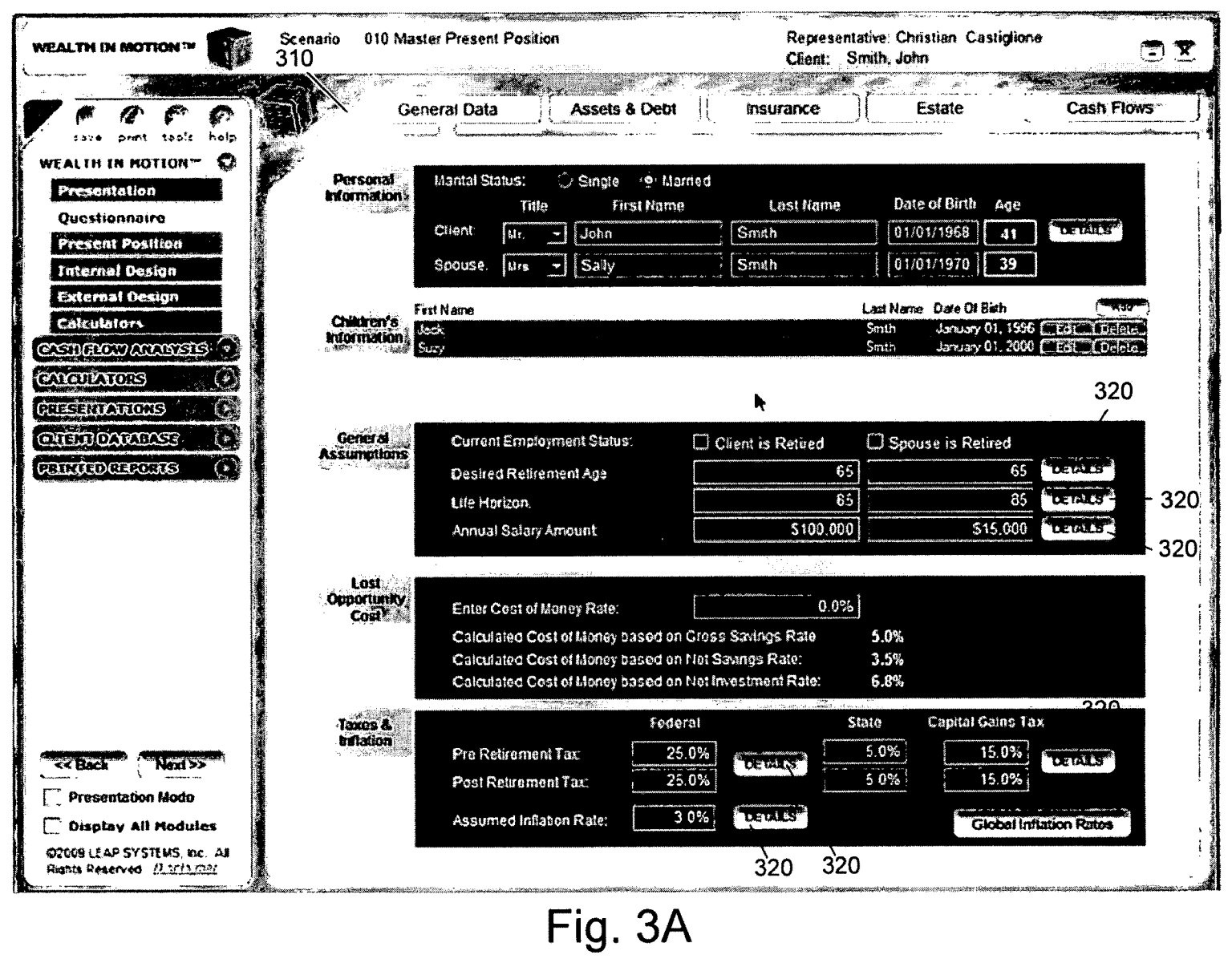
Figure 3B:
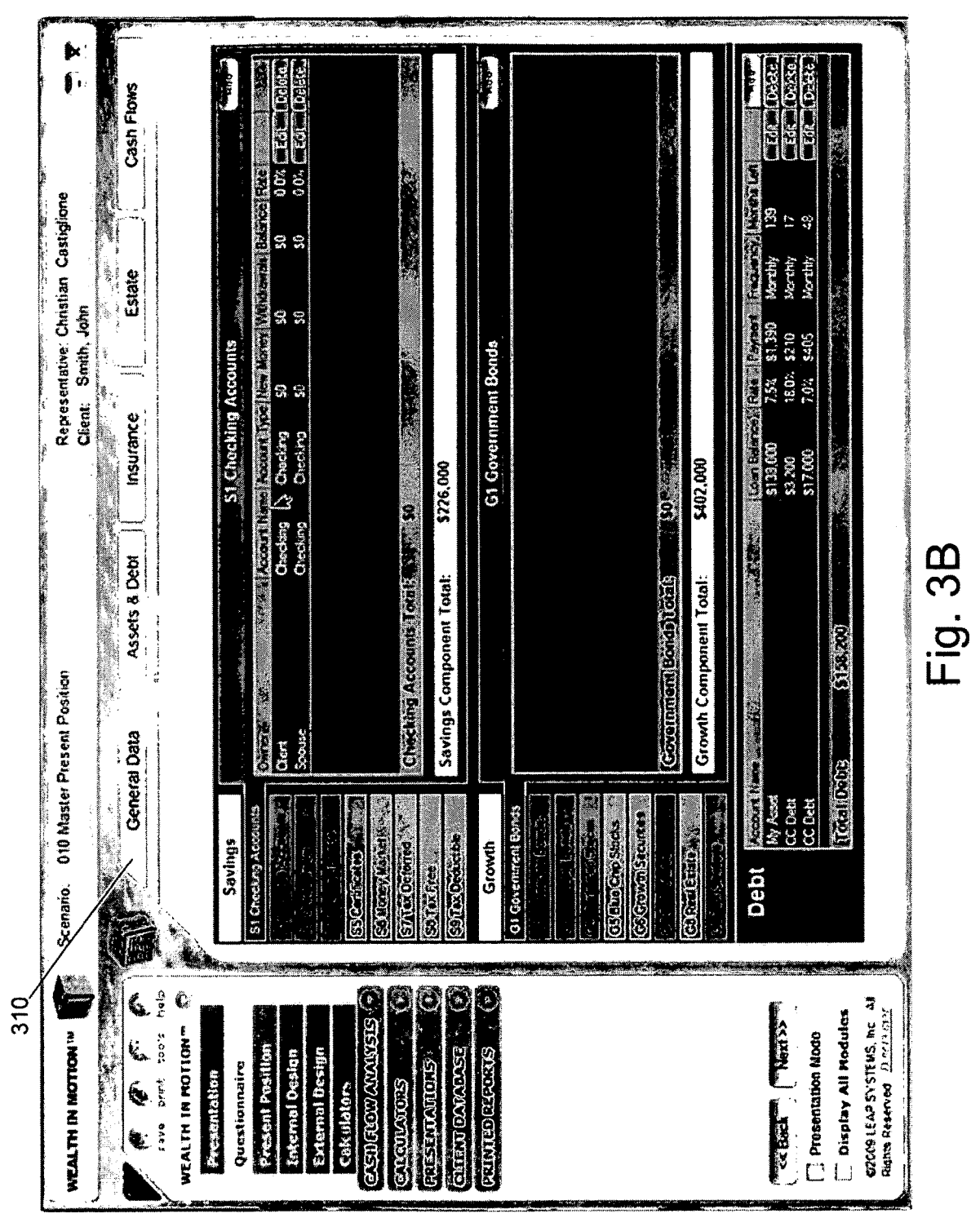
Figure 3C:
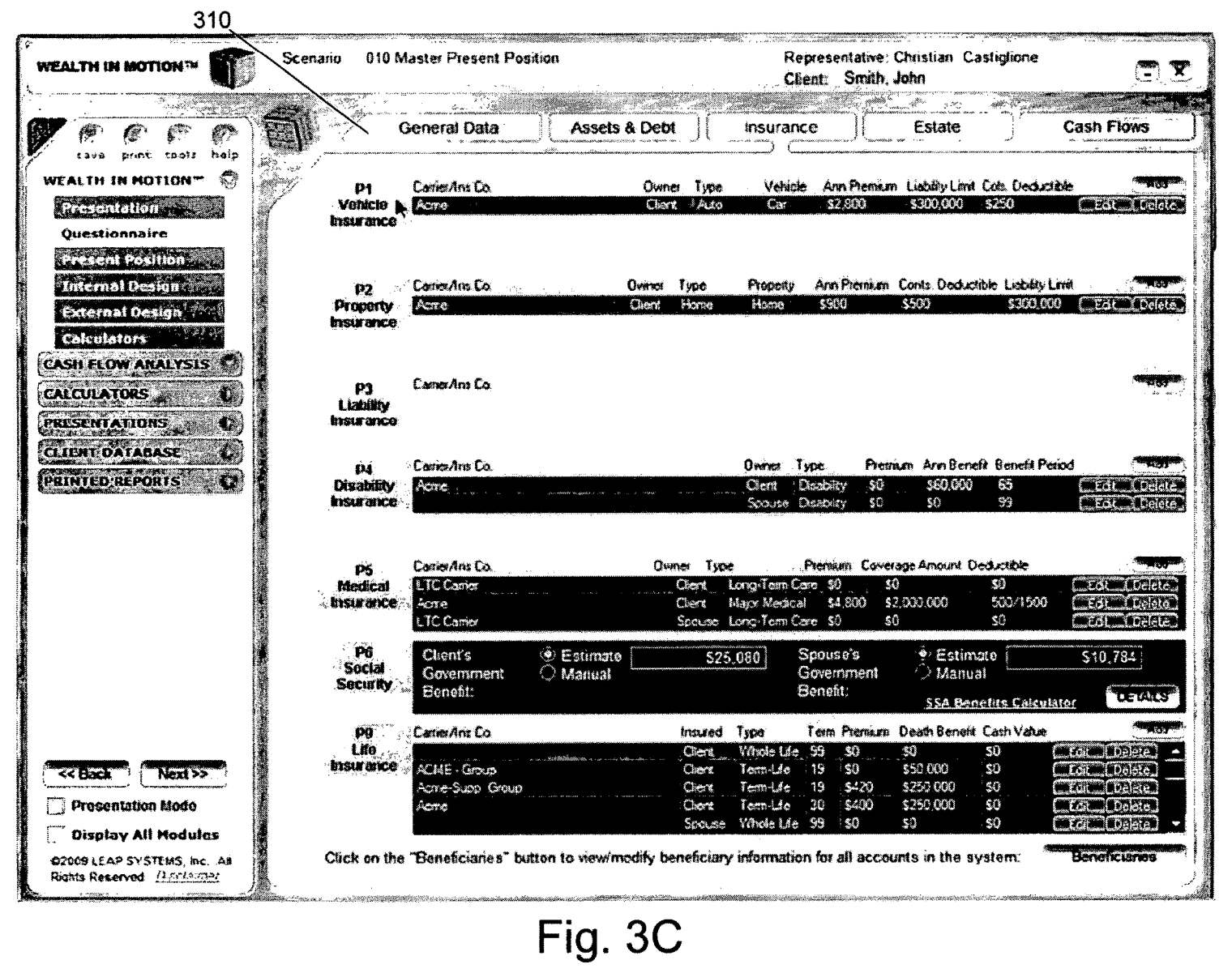
Figure 3D:
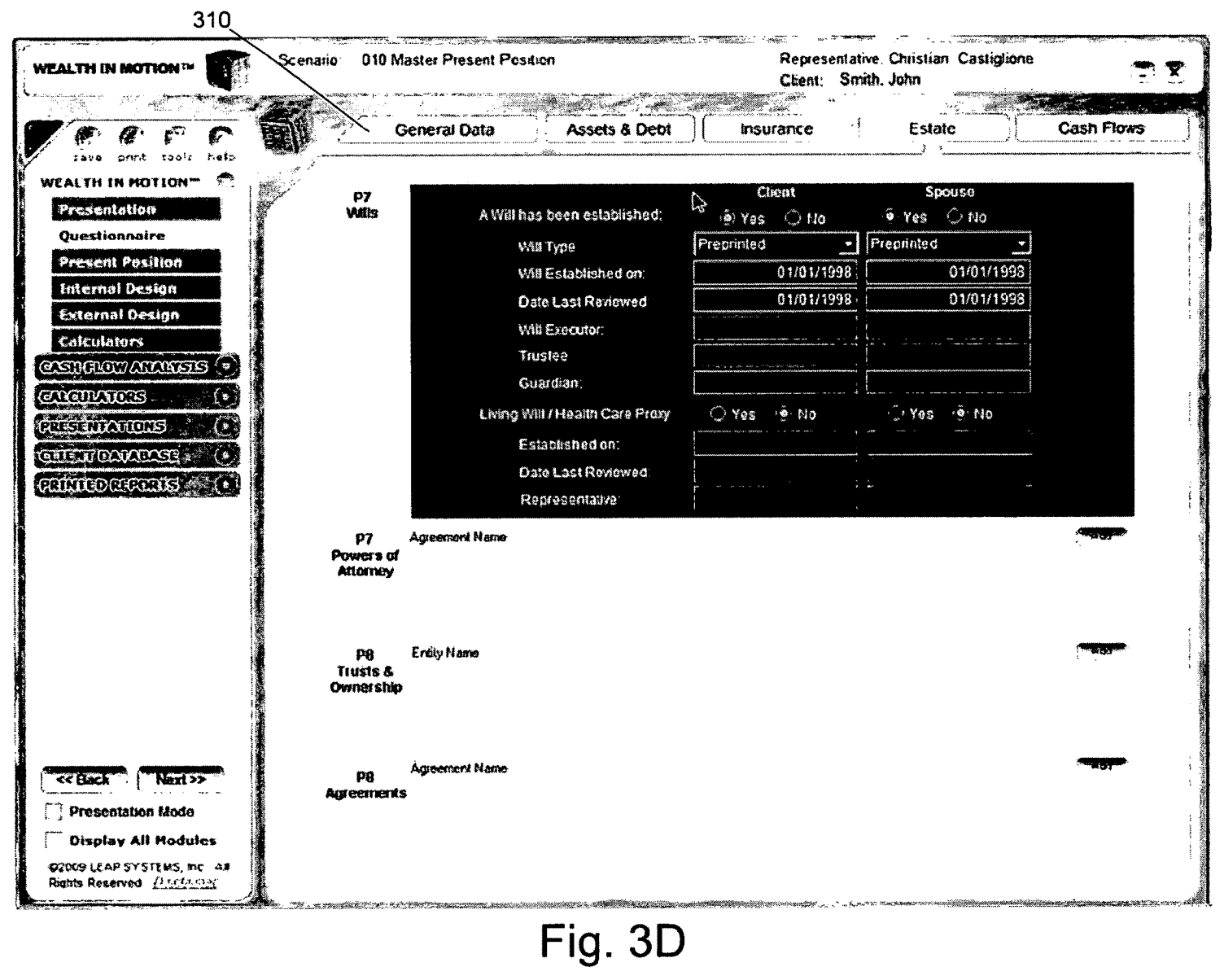
Figure 3E:
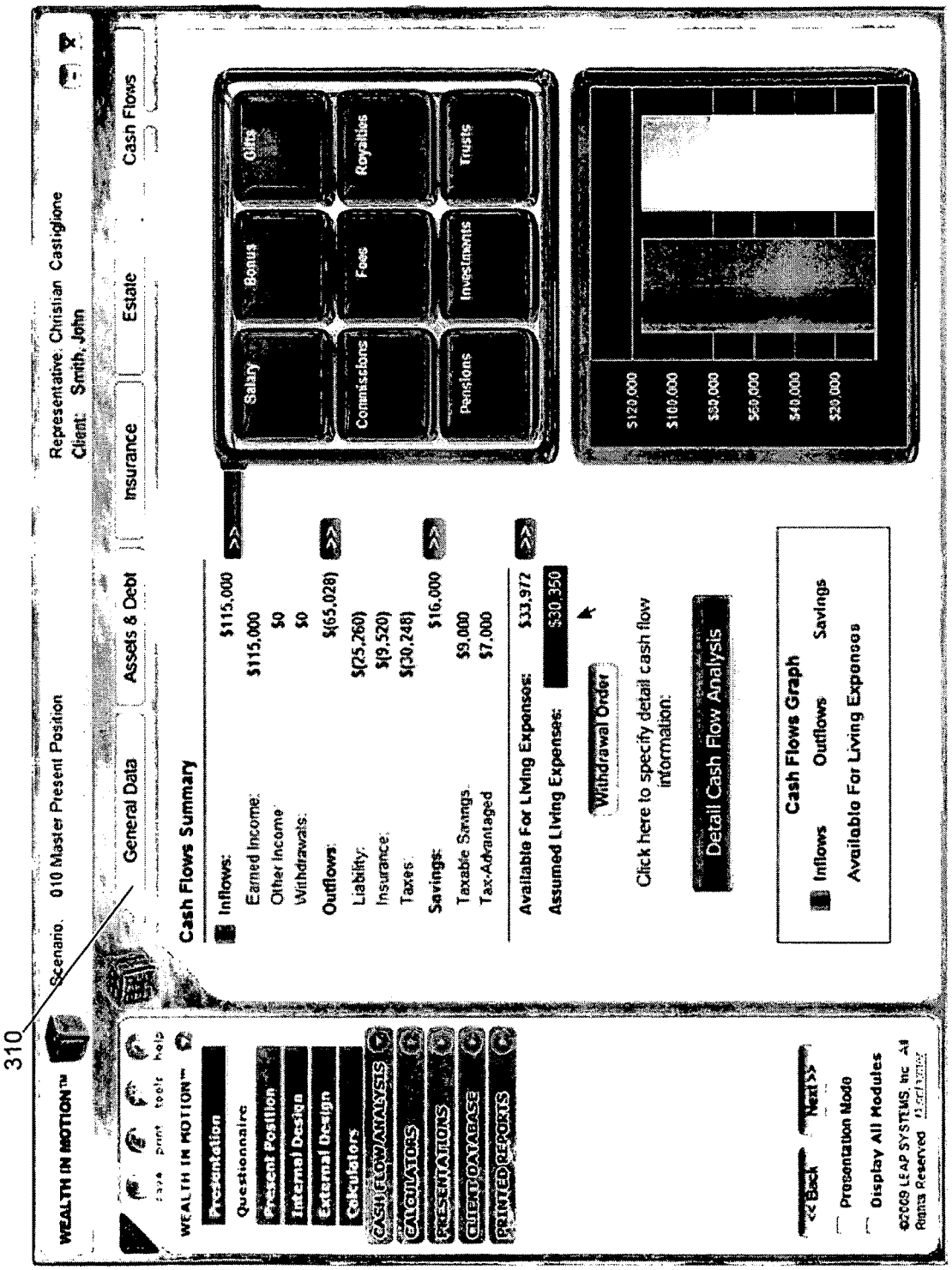

FIGS. 3A-3E illustrate segments of an exemplary questionnaire, requesting various finance-related data. As shown in the tab section 310 of the questionnaire, which is illustrated in all of FIGS. 3A-3E, the questionnaire can comprise one or more segments. Preferably, each segment can focus on a topic of the entity's financial situation. The segments can include, for example, a general data segment (FIG. 3A), an asset and debt segment (FIG. 3B), an insurance segment (FIG. 3C), an estate segment (FIG. 3D), and a cash flows segment (FIG. 3E). One of skill in the art will recognize, however, that the segments need not be limited to these.

As illustrated in the figures, each segment of the questionnaire can comprise one or more data fields in which the user can enter the entity's financial data. The segments can further comprise one or more buttons or other components that, when activated, can initiate requests for more detailed data entry. For example, as illustrated in FIG. 3A, each of the segments can comprise one or more buttons or other objects 320. When activated, such objects 320 may prompt the local input unit 210 to present the user with more detailed data entry fields for receiving specific data. A dialog comprising detailed data entry fields can appear, thereby prompting the user to enter detailed information regarding the original data field associated with the activated object 320. Such detailed data entry fields may receive, for example, account names, balances, contributions, withdrawals, hypothetical rates of return, premiums, interest rates, or other information relevant to precisely indicate a current financial position of an entity. Preferably, such detailed data entry fields are appropriately labeled to indicate to the user the type of specific data to be entered.

One or more fields of the questionnaire can be prefilled with default values. Additionally, one or more data fields can be associated with a list of predetermined scenarios. If the user selected a scenario associated with a data field, the data field can be automatically filled with values associated with the scenario. For example, and not limitation, if the user selects a scenario in which the entity's salary increases by five percent each year, such annual salary increases can be filled into one or more data fields representing the entity's salary.

After the user submits the questionnaire, the data entered into the questionnaire can be transferred into the local database 220. In the local database 220, the data can be associated with an identifier of the entity, such as the entity's name, unique identification number, or social security number.

In an exemplary embodiment of the financial modeling system 200, the financial modeling application 205 can be installed and executed on one or more computers of authorized users, such as financial analysts or insurance salesman. Therefore, it can be the case that entities desiring their finances to be modeled do not have access to the entire financial modeling application 205 unless they are at a site of such an authorized user. Therefore, it is preferred that such entities are able to enter their financial data from remote locations.

Accordingly, in an exemplary embodiment, an entity can enter his financial data from the remote computer 290. From the remote computer 290, the entity can access the remote input unit 254 of the server 250 through the network 270. Such access can, but need not, occur through use of a web client 124 on the remote computer 290. The remote input unit 254 can present the entity with a comprehensive questionnaire, which can be similar to that presented by the local input unit 210. When data is submitted through the remote questionnaire, the data can be transferred to the server 250 and stored in the remote database 258.

The local database 220 and the remote database 258 can exchange data across the network 270. Data exchanges between the databases 220 and 258 can occur according to a schedule or, alternatively, when an exchange is affirmatively requested by a user of the financial modeling system 200. For example, when a user at the local computer 100 requests to import data from the remote database 258, data can be transferred from the remote database 258 to the local database 220. For further example, if the user requests to export data, data can be transferred from the local database 220 to the remote database 258. Based on the user's preference, the transferred data can comprise either a select portion of data stored on the source database, or can comprise all data that has been updated since a previous transfer of data. In an exemplary embodiment of the financial modeling system 200, the user can request to synchronize the data stored in the databases 220 and 258. In that case, transfers can occur in both directions to ensure that the databases 220 and 258 contain the same data. The user can specify which database will control when the databases 220 and 258 hold conflicting data. Preferably, by default, the local database can control such conflicts.

B. Selection Unit 230

The selection unit 230 of the financial modeling system 200 can present a user with a plurality of files or topics. For example, and not limitation, the selection unit 230 can display a list of entities for which financial data is stored in the local database 220. The selection unit 230 can also display a list of entities for whom an account has been set up but for whom incomplete data currently exists on the local database 220. If an entity falls into this latter category, the user can check whether the entity has financial data stored on the remote database 258. If so, such data can be imported to the local database 220.

The user can select an entity from the display provided by the selection unit 230. The selection unit 230 can receive the user's selection, and can retrieve the financial data associated with the selected entity. Such financial data can then be made available to the compartmentalization unit 250.

C. Compartmentalization Unit 250

The compartmentalization unit 250 can categorize financial data. For example, the compartmentalization unit 250 can categorize an entity's financial data into a plurality of financial components, which can each be further segmented into a plurality of sub-components.

Figure 4A:
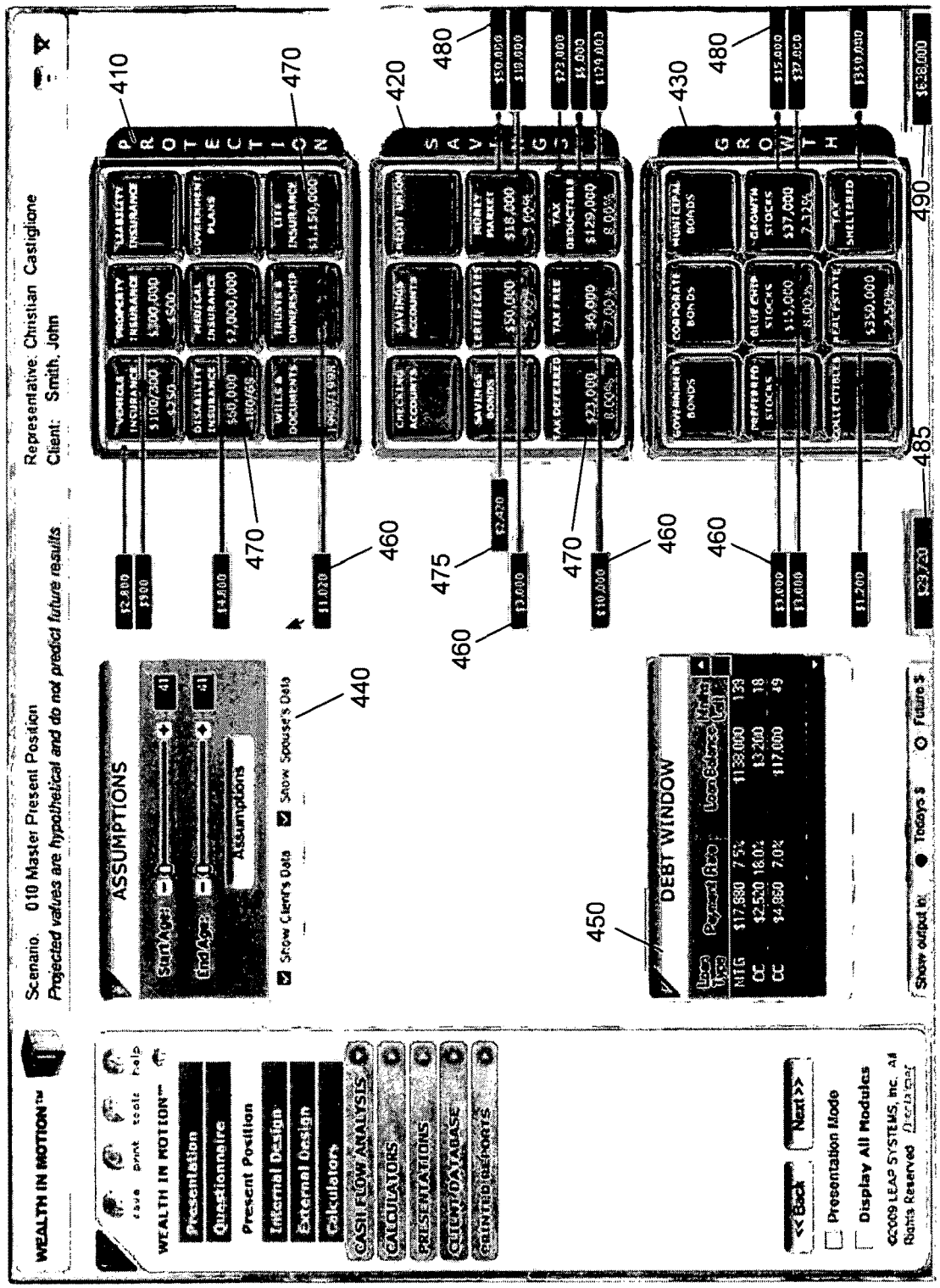
FIG. 4A illustrates use of components and sub-components of the financial modeling system, according to an exemplary embodiment of the present invention.

FIG. 4A illustrates an example of components and sub-components into which the compartmentalization unit 250 can categorize financial data. For example, the components can comprise a protection component 410, a savings component 420, a growth component 430, and a debt component 450. In an exemplary embodiment of the financial modeling system 200, the protection component 410 can correspond to funds that are used to protect the entity's wealth and well-being. The savings component 420 can correspond to funds that are being saved and accumulated. The growth component 430 can correspond to funds that are allowed to grow and multiply. Finally, the debt component 450 can correspond to liabilities, such as debts, of the entity.

In an exemplary embodiment of the financial modeling system 200, the debt component 450 may behave differently than the other components 410, 420, and 430. As illustrated, the debt component 450 may show a state of the entity's debt or other liabilities at the start age. For example, the debt component 450 can display how much is owed, interest rates, and pay-off terms. The debt component 450 need not comprise distinctly labeled sub-components. The debt component 450 may, however, comprise one or more columns or other organizational structures to effectively articulate the entity's debts.

As shown in FIG. 4A, the protection component 410 can comprise the following sub-components: vehicle insurance, property insurance, liability insurance, disability insurance, medical insurance, government plans, wills and documents, trusts and ownerships, and life insurance. The savings component 420 can comprise the following sub-components: checking, savings, credit union, savings bonds, certificates, money markets, tax deferred, tax free, and tax deductible accounts. Finally, the growth component 430 can comprise the following sub-components: government bonds, corporate bonds, municipal bonds, preferred stocks, blue chip stocks, growth stocks, collectibles, real estate, and tax sheltered investments. Additionally, other protection, savings, and growth instruments may be available and may fit within this framework.

In an exemplary embodiment of the compartmentalization unit 250, the sub-components can be arranged within the components in a predetermined, logical, and scientific manner. For example, as illustrated in FIG. 4A, the nine sub-components of each component can be arranged in three rows of three. Further, the sub-components can be positioned based on a hierarchical pattern. Each level of sub-components can represent increased function or use relative to a previous level positioned above. For example, sub-components in a second level can provide two functions or uses, while sub-components in a third level can provide three functions or uses.

For further example, and not limitation, in the protection component 410, vehicle insurance, property insurance, and liability insurance perform only one function, the protection of assets. These elements generally do not protect income or provide protection for the consequences of death. Consequently, these sub-components are positioned on the first level of the component. Disability insurance, medical insurance, and government plans can perform two functions, the protection of income and protection of assets. These do not, however, provide protection from consequences of death. Consequently, these sub-components are listed on the second level. Lastly, wills and documents, trusts and ownership, and life insurance can perform three functions, the protection of income, assets, and death consequences. Because of their breadth of protection, these sub-components can be positioned on the third level of the protection components 410.

In the savings component 420, checking accounts, savings accounts and credit unions can perform a single function. They can provide a safety net. However, these sub-components generally do not provide high yields or tax benefits, so they are positioned on the first level. Saving bonds, certificates of deposit, and money market accounts can perform two functions, safety and higher yield. Therefore, these sub-components can be positioned on the second level. Tax deferred savings, tax free savings, and tax deductible savings can each perform three functions, safety, higher yield, and tax benefits. Consequently, these sub-components can be positioned on the third level.

Figure 4B:
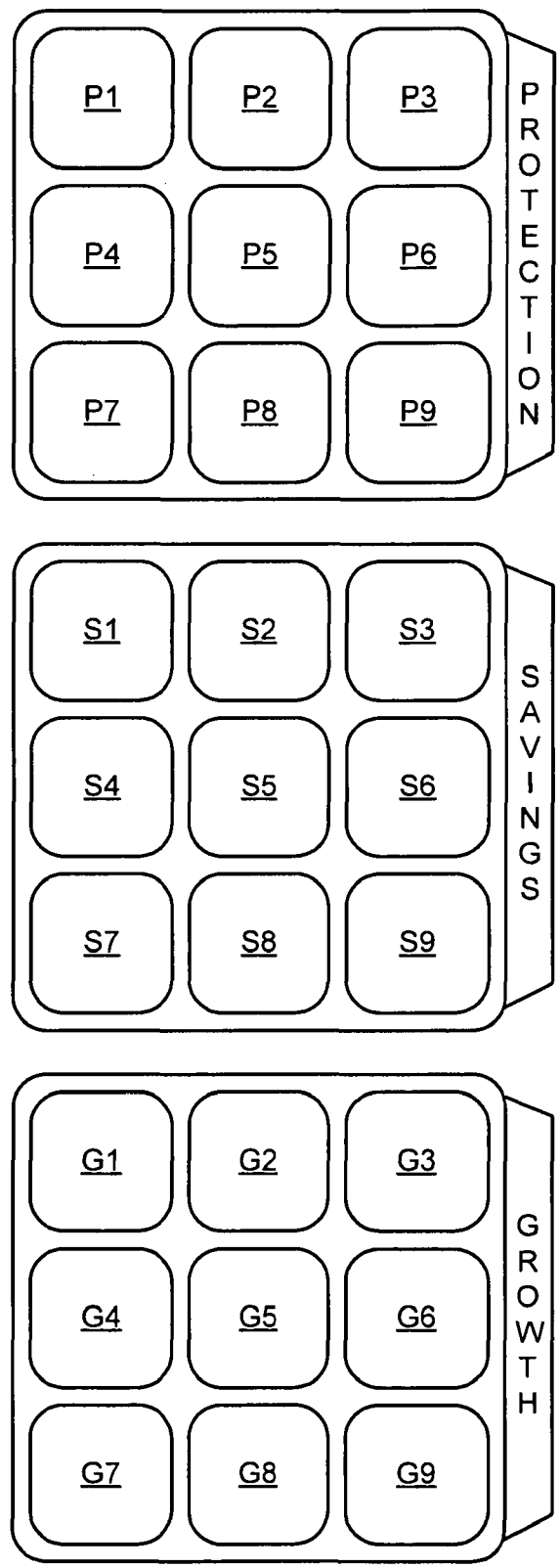
FIG. 4B illustrates a labeling scheme for the sub-components of the financial modeling system, according to an exemplary embodiment of the present invention.

Additionally, the sub-components can be positioned left to right based on productivity, liquidity, and risk. For example, suppose the nine sub-components of a component are numbered from one to nine, such that the numbering is left to right and then top to bottom. As illustrated in FIG. 4B, each sub-component can be referred to by a two-digit identifier consisting of a letter signifying its parent component, as well as a number from one to nine. As the sub-components proceed from one to nine, the following can occur: (i) productivity and performance can increase; (ii) liquidity can decrease; and (iii) risk can increase. For instance, tax deductible savings can be more productive and performing that checking accounts and tax deferred savings. However, tax deductible savings can also be less liquid and more risky than checking accounts and tax deferred savings.

Regardless of the components and sub-components used by the financial modeling system 200, the compartmentalization unit 250 can conduct initial processing of financial data. During initial processing, the compartmentalization unit 250 can categorize the data into the components and sub-components, and can display a graphical representation of such categorization. Such graphical representation can be similar to that illustrated by FIG. 4A.

Although not illustrated in FIG. 4A, one or more of the sub-components can be emphasized to indicate a characteristic of one or more accounts associated with such sub-components. For example, the sub-components can be color-coded according to a predetermined scheme. A green coloring can indicate that a sub-component passes one or more benchmarks related to the sub-component. A yellow coloring can indicate that a sub-component received borderline results (e.g., neither passing nor failing, or barely passing) for the one or more benchmarks. In contrast, a red coloring can indicate that a sub-component failed the one or more benchmarks and, therefore, one or more accounts associated with the sub-component require attention.

Figure 5:
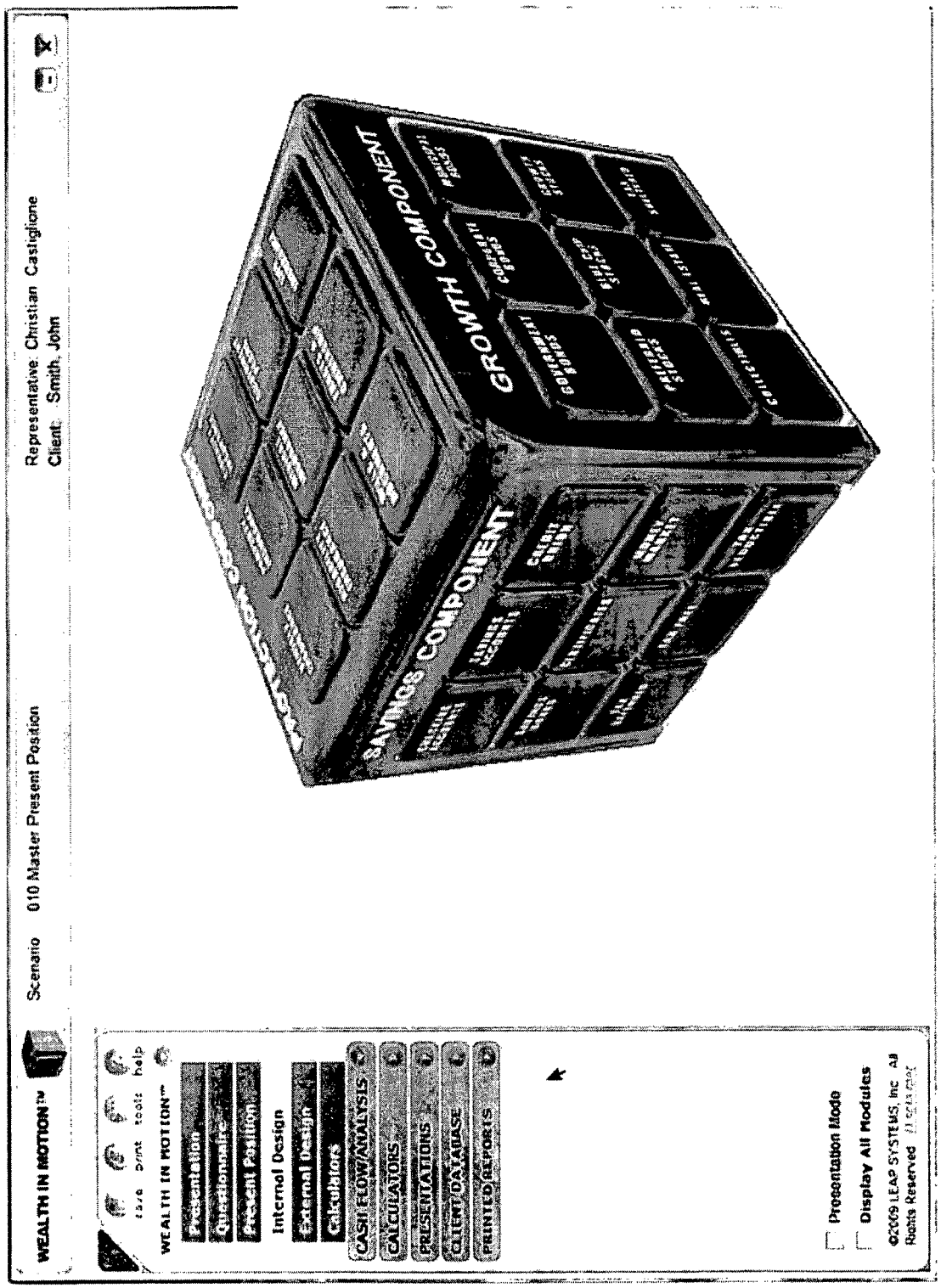
FIG. 5 illustrates an overview of the components and sub-components of the financial modeling system, according to an exemplary embodiment of the present invention.

The financial modeling system 200 can further enable detailed views of the various components and sub-components. For example, at the user's prompting, the user can be presented with an overview of the components, as illustrated in FIG. 5. From the overview, the user can select a particular component or sub-component to view in detail.

Figure 6A:
FIG. 6A illustrates a description of a sub-component of the financial modeling system, according to an exemplary embodiment of the present invention.

Each sub-component can comprise various elements, which the user can view. For example, if the user selects the vehicle insurance sub-component, the user can be presented with a display similar to that illustrated in FIG. 6A. As shown in FIG. 6A, the user can be presented with a general description of the sub-component. Additionally, if the sub-component comprises one or more categories, the user can select to view the entity's financial details in such categories. For example, as shown, vehicle insurance can be sub-categorized into car and auto, boat and watercraft, and other vehicles.

Figure 6B:
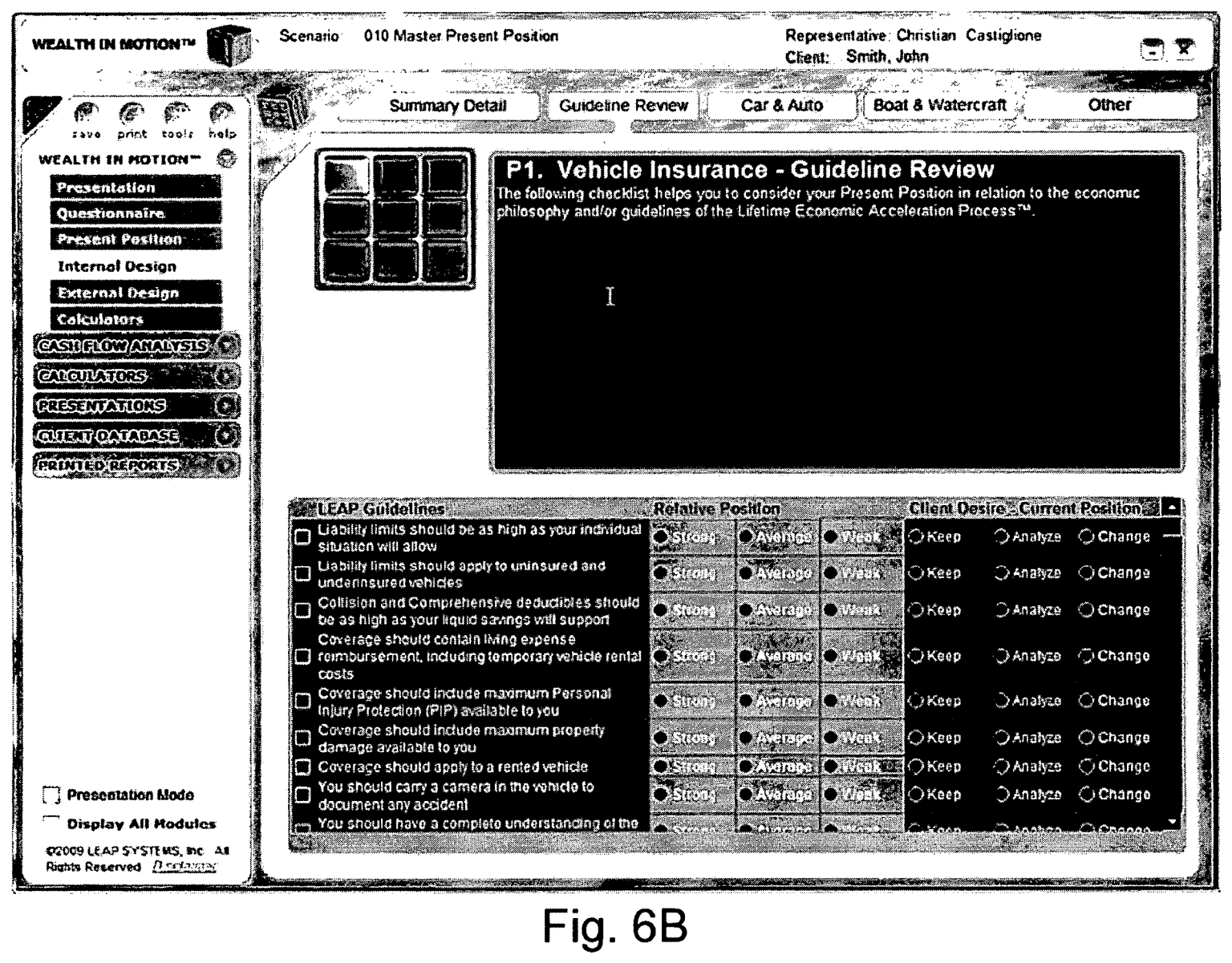

As illustrated in FIG. 6B, the user or entity can view and modify a guideline review pertaining to the sub-component. The guideline review can be accessible from the local computer 100 or from the remote computer 290. From the remote computer 290, the entity can modify the guideline review by accessing a web-based, client-side portal. In an exemplary embodiment, the guideline review can prompt the user or entity to enter the entity's opinion regarding various aspects of the sub-component. Accordingly, the guideline review can present one or more questions regarding the entity. The answers to such questions can be considered in determining whether values or inputs associated with the given sub-component should be modified.

D. Simulation Unit 260

Returning now to FIG. 4A, the simulation unit 260 can be responsible for a large portion of financial processing and modeling performed by the financial modeling system 200. The simulation unit 260 can output a graphical representation of a financial situation, such as that illustrated in FIG. 4A.

Although not illustrated in FIG. 4A, the simulation unit 260 can calculate an entity's wealth based on received data relating to the entity. Wealth can be calculated in various manners. For example, an equation can be used to calculate wealth, as follows:

$$\text{Wealth} = (A * RoR * \$ * \text{Time}) / (I * PO * TC * PC * \text{Tax} * E),$$

where RoR represents a rate of return; I represents an interest rate; PO represents the entity's planned age of obsolescence; TC is a factor representing a rate of change in technology; PC is a factor representing the entity's propensity to spend or increase spending as income increases; and Tax represents the entity's estimated tax rate.

A simpler, and perhaps less accurate, calculation of the entity's wealth may be described as follows:

$$\text{Wealth} = (RoR * \$ * \text{Time}) / (I + \text{Tax})$$

In addition, or alternatively to the above equation, the wealth calculation may comprise various sub-calculations, the combination of which define the entity's wealth. Exemplary sub-calculations defining wealth may include the following eight steps, which may be performed in various orders:

1. Calculate gross earned income from all sources
2. Calculate planned withdrawals from all Savings, Growth, and Ownership Trust accounts
3. Calculate primary expenses from all sources Such primary expenses may include both variable and fixed living expenses, as well as income taxes on gross earned income. Income taxes may be calculated by applying a hypothetical user-defined tax rate or, alternatively, a simulator-derived tax rate based on a government tax code. Tax rates may incorporate expected exemptions, deductions, credits, or various combinations thereof. Primary expenses may additionally include effects of various wealth-eroding factors, such as planned obsolescence, technological change, propensity to consume, standard of living increases, inflation, and user-defined factors. Wealth-eroding factors may be expressed as, for examples, stated values or percentages of gross income.

4. Calculate shortfall or surplus

If the simulation unit 260 determines that a surplus exists, the surplus may be deposited into sub-component S1, and increased based on the rate of return for S1. In contrast, if there is a shortfall, funds may be withdrawn from existing accounts S1-S9 and G1-G9, as governed by a user defined withdrawal order 5. Calculate rates of return on Savings (S1-S9) and Investment Assets (G1-G9) and Ownership and Trust accounts (P8)

The calculated rates of return may be applied to both account balances and contributions to the applicable accounts.

6. Calculate savings and investment taxes

As described above, the tax calculation may be based on a user-defined or simulator-derived tax rate. Taxes may be calculated for taxable Savings (S1-S9), Investment Assets (G1-G9), and Ownership and Trust accounts (P8). Additionally, taxes may be calculated when tax-triggering withdrawals are made from an account. To pay taxes, funds may be taken from a surplus or from one or more accounts.

7. Calculate taxes from account withdrawals for qualified plans

The simulation unit 260 may carry over additional "tax on tax" to next year, or may increase desired withdrawal amounts to cover expected taxes on the withdrawals 8. Calculate new debt balances New debt balances may be based on old debt balances, interest rates, payments made towards the debts, or various combinations thereof.

The above guidelines for calculating wealth are merely provided as an example. One of ordinary skill in the art will recognize that wealth can be calculated or estimated by various means.

The simulation unit 260 may calculate the entity's wealth upon request from a user, or in some embodiments, without prompting. Results of such calculations can be utilized at least to gain an understanding of the entity's present financial position.

Referring back to FIG. 4A, in addition to displaying the components and sub-components, which are discussed above, the simulation unit 260 can display an assumptions segment 440, one or more inputs 460, one or more current values 470, one or more current outputs 475, and one or more future outputs 480.

The assumptions segment 440 can represent various assumptions utilized in a current simulation. For example, as illustrated in FIG. 4A, a start age and end age of the entity can be assumed. The inputs 460 and current values 470 can respectively represent funds contributed and held in accounts, or sub-components, by the entity at the start age. Similarly, the current outputs 475 can represent output in the year of the start age. In contrast, the future outputs 480 can represent output values at the end age. Neither the start age nor the end age need be the entity's current age. If the start age is greater than the entity's current age, then the inputs 460, current values 470, and current outputs 475 can be projected values based on calculations of the simulation unit 260.

An input total 485 and an output total 490 can also be calculated and displayed. The future outputs 480 and output total 490 can reflect a future value of money or, alternatively, a present value of money. In an exemplary embodiment of the financial modeling system 200, the user can select whether to view present or future values of the outputs 480 and 490. If selected, present values of the outputs 480 and 490 can reduce the future values based on the assumed inflation percentage.

Figure 7:
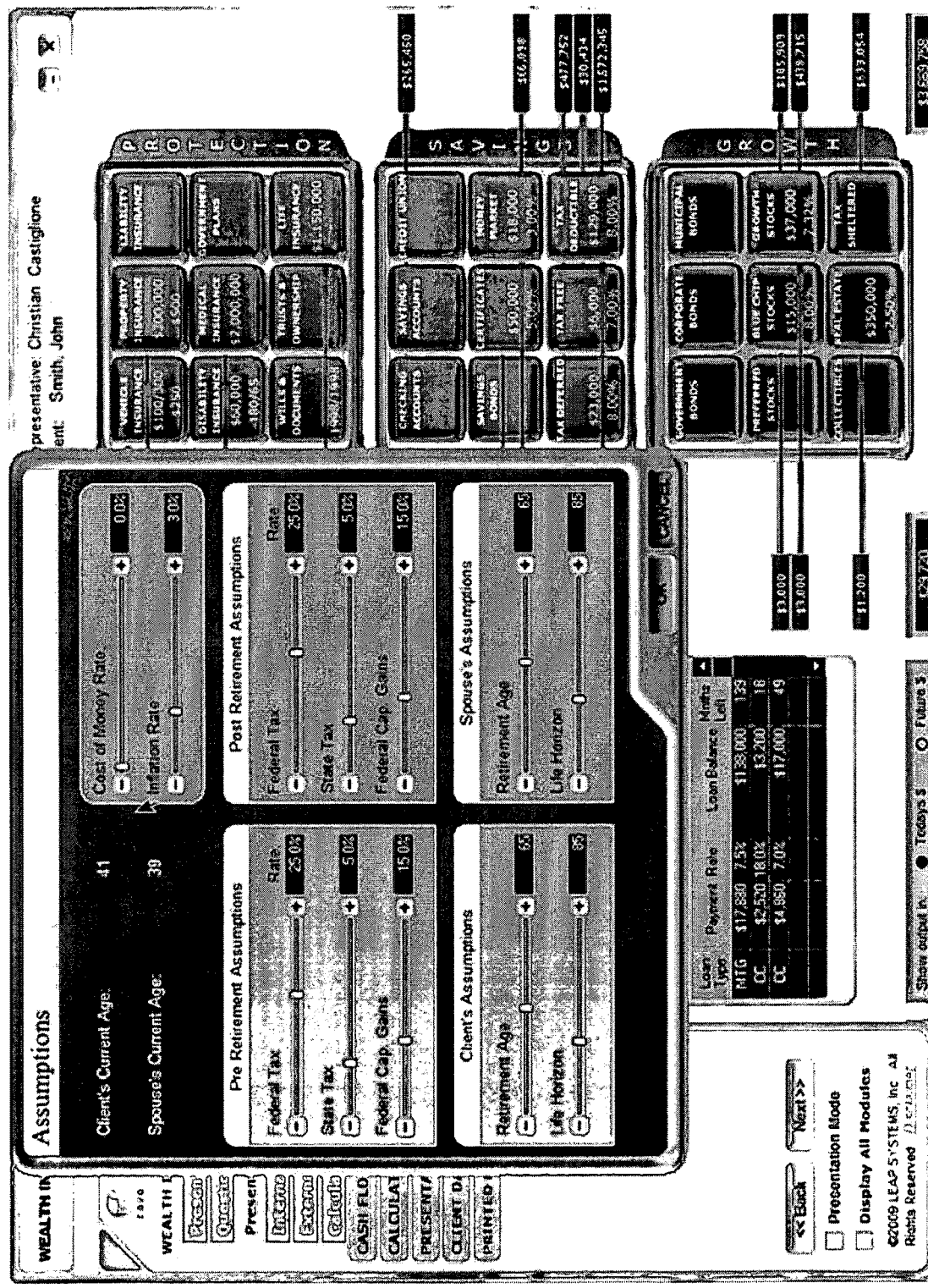
FIG. 7 illustrates assumptions used in a financial model of the financial modeling system, according to an exemplary embodiment of the present invention.

It is not necessary that all assumptions, calculations, or tabulations be visible from a simulation display. For example, the user can choose to view or amend more detailed assumptions. As shown in FIG. 4A, the user can be presented with an assumptions object 442, such as a button. Clicking this object 442, or otherwise indicating a desire to view more detailed assumptions, can prompt display of a more detailed set of assumptions. Such a set of assumptions is illustrated in FIG. 7. As shown in FIG. 7, the user can amend, for example, tax rates, cost of money, and an inflation rate.

Returning now to FIG. 4A, the user can change various factors, such as the start and end ages. In response to changes and updates, the display can dynamically and automatically update based on the changed factors. The inputs 460, current values 470, current outputs 475, and future outputs 480 can be dynamically calculated and displayed by the simulation unit 260. If an assumption is modified, for example, the simulation unit 260 can consider the modification to determine how various values should change. For instance, if the end age is increased, the outputs 480 and 490 can update to output values at the updated end age. For further example, if a debt is paid off in one year, the following year can increase cash flows to correspond to the funds that had previously been contributed to debt repayment.

The simulation unit 260 can be capable of focusing on all components, one or more components, all sub-components, one or more sub-components, or a combination thereof. Adaptability of the simulation unit 260 in this manner may enable the user to analyze the entity's present position with respect to a select portion of the entity's finances. Additionally, the user can select whether to analyze new money (i.e., input values 460), old money (i.e., current values 470), or both. New money may represent an entity's defined contributions or premiums into a particular financial account or vehicle. In contrast, old money may represent an entity's current account balance. The current account balance may be withdrawn, for example, via (i) interest-only, (ii) pay down over a period of years, or by way of a specified withdrawal amount based on a current balance for a number of years, or (iii) many variations or combinations thereof. For example, as shown in FIGS. 8A-8E, the user can analyze the entity's present position with respect to new money invested in money market accounts S6. As illustrated, the simulation unit 260 can navigate through one or more predetermined steps to illustrate the entity's present position with respect to the selected sub-component S6.

Figure 8A:
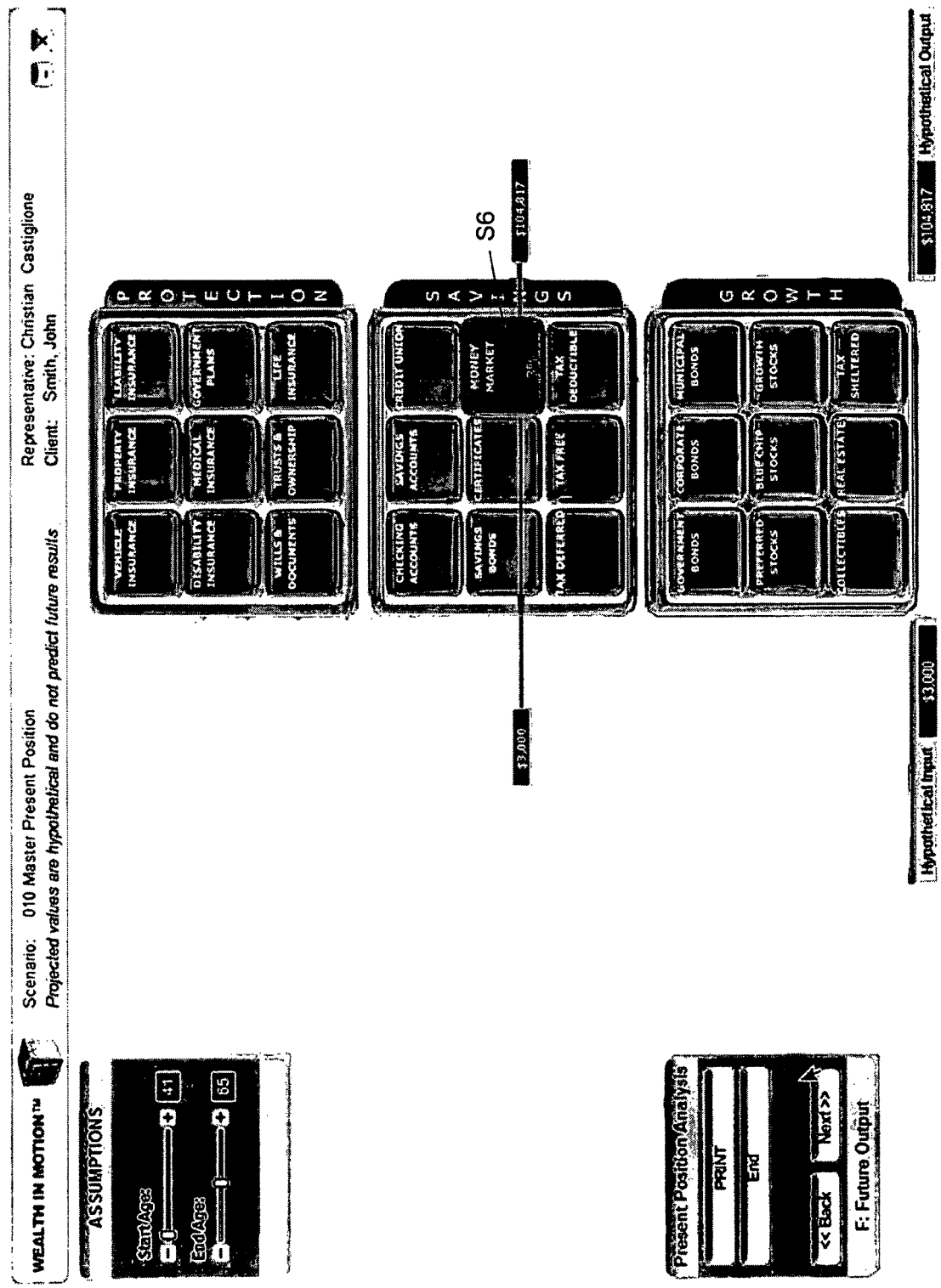
FIGS. 8A-8E illustrate a present financial position associated with a select sub-component, according to an exemplary embodiment of the present invention.
Figure 8B:
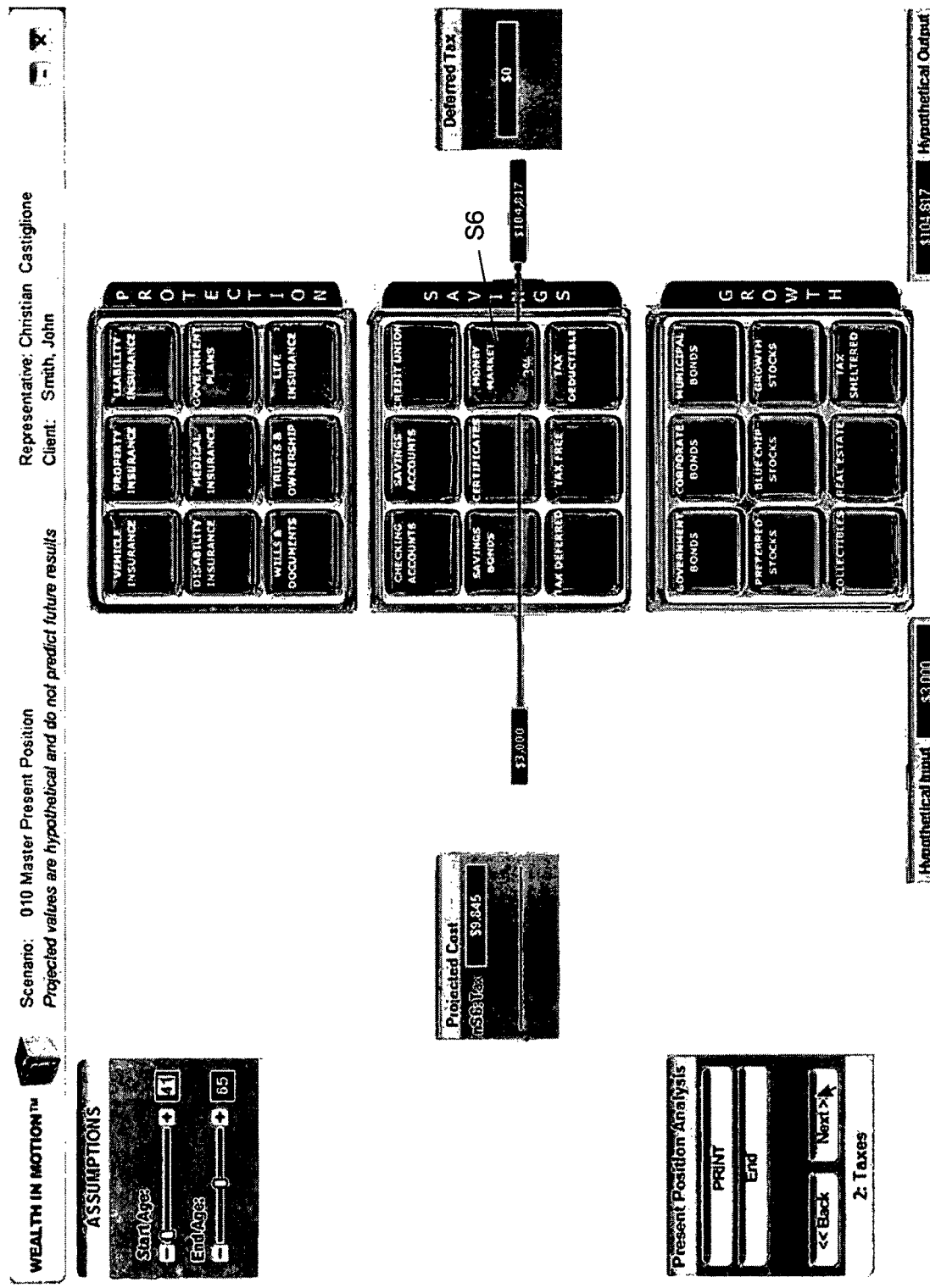
Figure 8C:
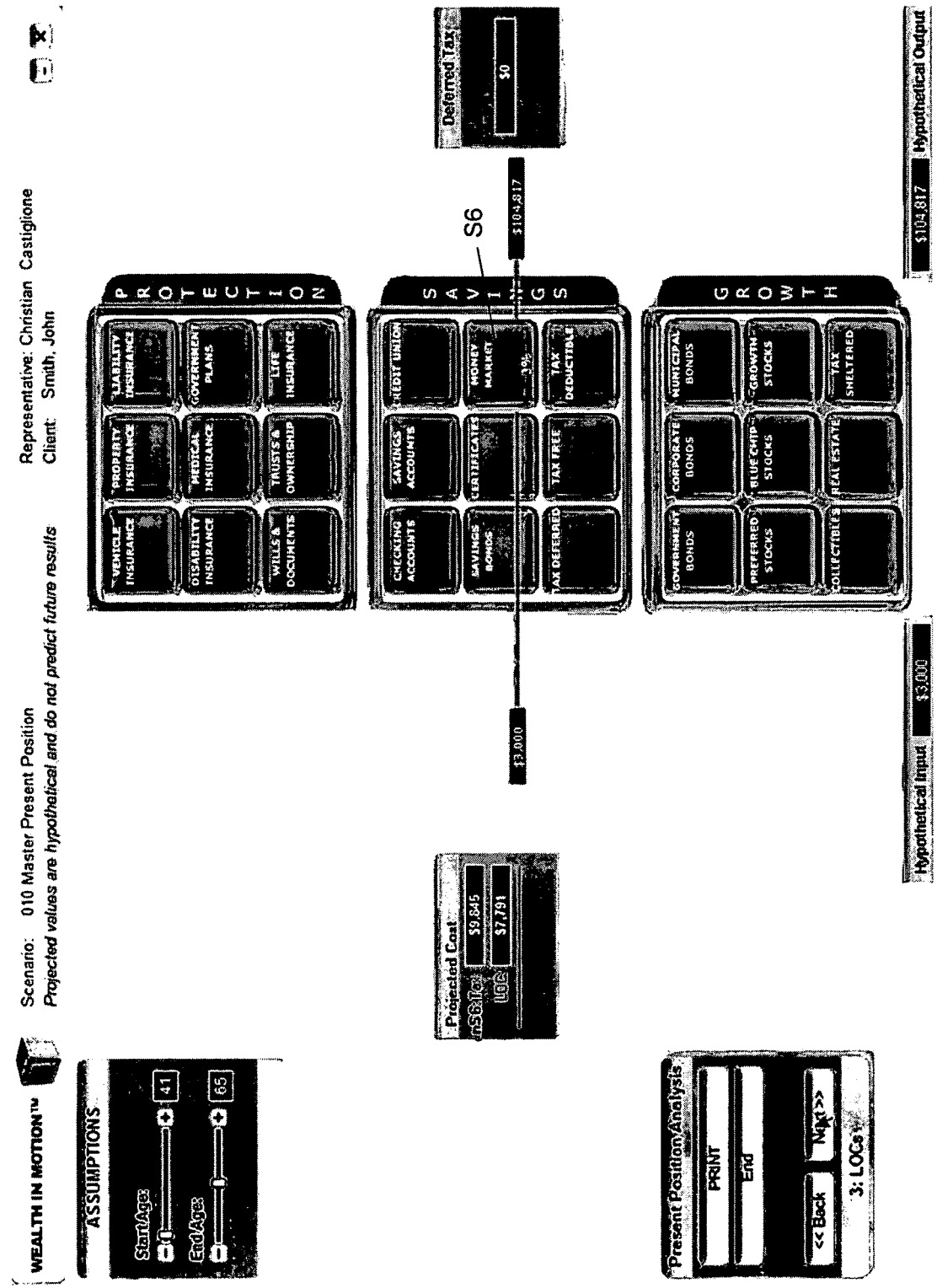
Figure 8D:
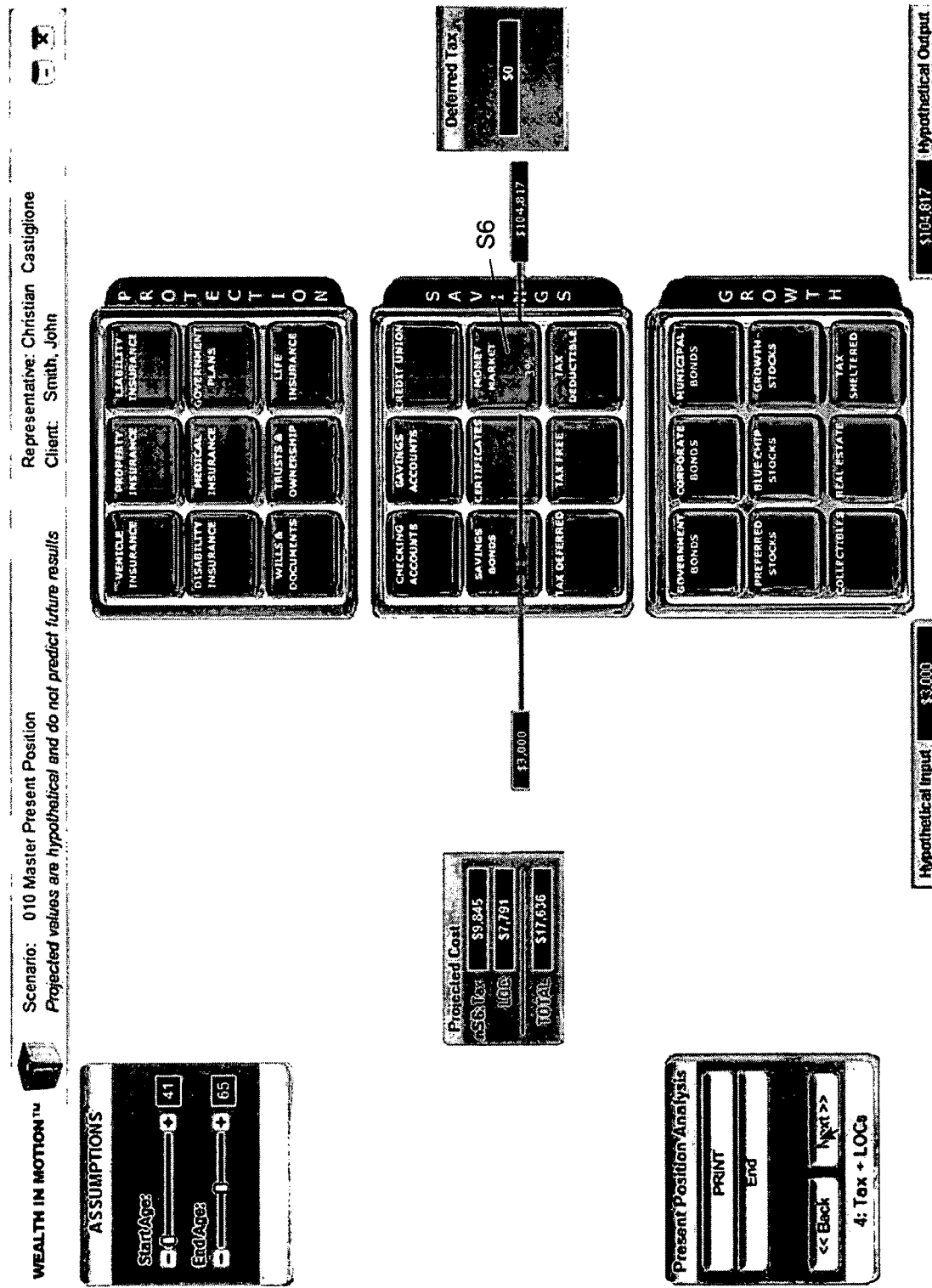

In a first step, as shown in FIG. 8A, the simulation unit 260 can illustrate new money entering the money markets S6, as well as a projected output 480 based on the input of such new money. As shown in FIG. 8B, another step of the analysis can illustrate taxes associated with new money in the money markets S6. The simulation unit 260 can calculate and display deferred taxes and taxes paid on money invested into the money markets S6. As shown in FIG. 8C, in an additional step, the simulation unit 260 can calculate and display lost opportunity costs (LOCs) associated with the taxes paid. Taxes and LOCs can be calculated based on assumptions of tax rates and a cost of money rate, which may be user-defined or automatically calculated by the unit. More specifically, tax rates used in the simulation may be estimated by the user, or the user may choose to use actual tax rates. If actual tax rates are used, the simulation unit 260 may use tax rates published by the government for current and future years. Such published tax rates may be downloaded to the simulation unit 260 through the network 270. In another step, as illustrated in FIG. 8D, the simulation unit 260 can combine the taxes and LOCs. The total of the taxes and LOCs represents a total cost of investing the indicated new money in the money markets S6.

Figure 8E:
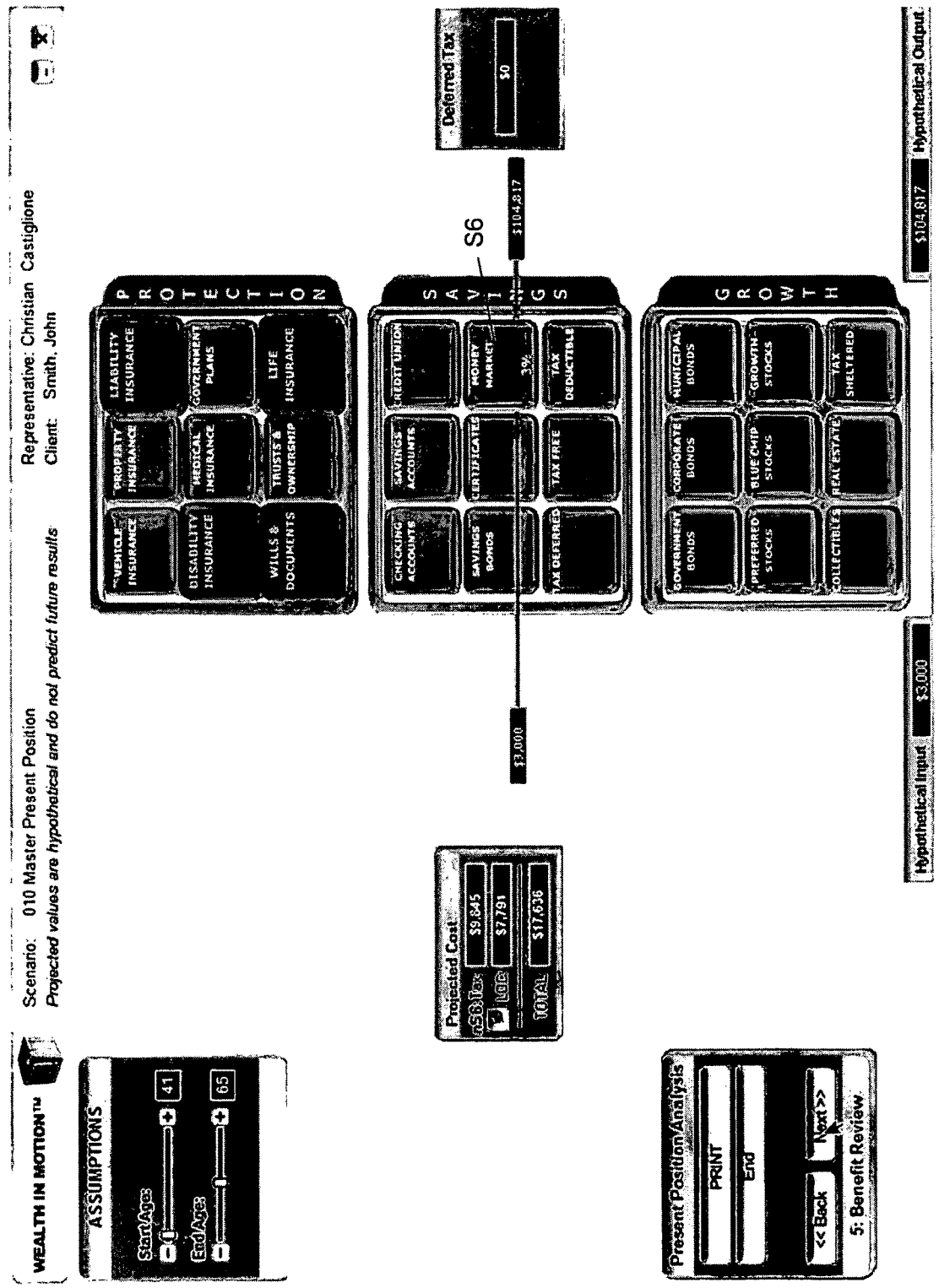

Finally, as illustrated in FIG. 8E, the simulation unit 260 can perform a benefit review. The benefit review can emphasize one or more other sub-components that either (i) may be affected by the simulated transactions, or (ii) may deserve attention because of the simulated transactions. Some data relevant in the benefit review may vary for different entities based on the entity's jurisdiction or place of residence. As such, the benefit review may comprise downloading jurisdictionally-specific data, which may be sorted and displayed based on the entity's jurisdiction In the illustrated case, emphasis of the one or more relevant other sub-components is provided by lighting up such other sub-components, but this particular type of emphasis is not required. Various means of bringing the user's attention to such sub-components may be provided. For example, and not limitation, the simulation unit 260 can also change the coloring or size of such other sub-components.

In an exemplary embodiment of the financial modeling system 200, the simulation unit 260 can progress from one step to a following step when the user indicates a desire to continue, such as by clicking an appropriately labeled button or other object, or by providing an audible request to continue. Such button or other object may be labeled, for example, "NEXT," "FORWARD," or "CONTINUE." Alternatively, however, the simulation unit 260 can proceed to the following step after a predetermined time frame.

The simulation unit 260 can be further capable of simulating movement of money from one or more sub-components to one or more other sub-components. In an exemplary embodiment of the financial modeling system 200, simulation of such movement follows a predetermined set of steps. The steps can be at least partially determined by the source and destination sub-components of the funds to be moved.

Figure 9:
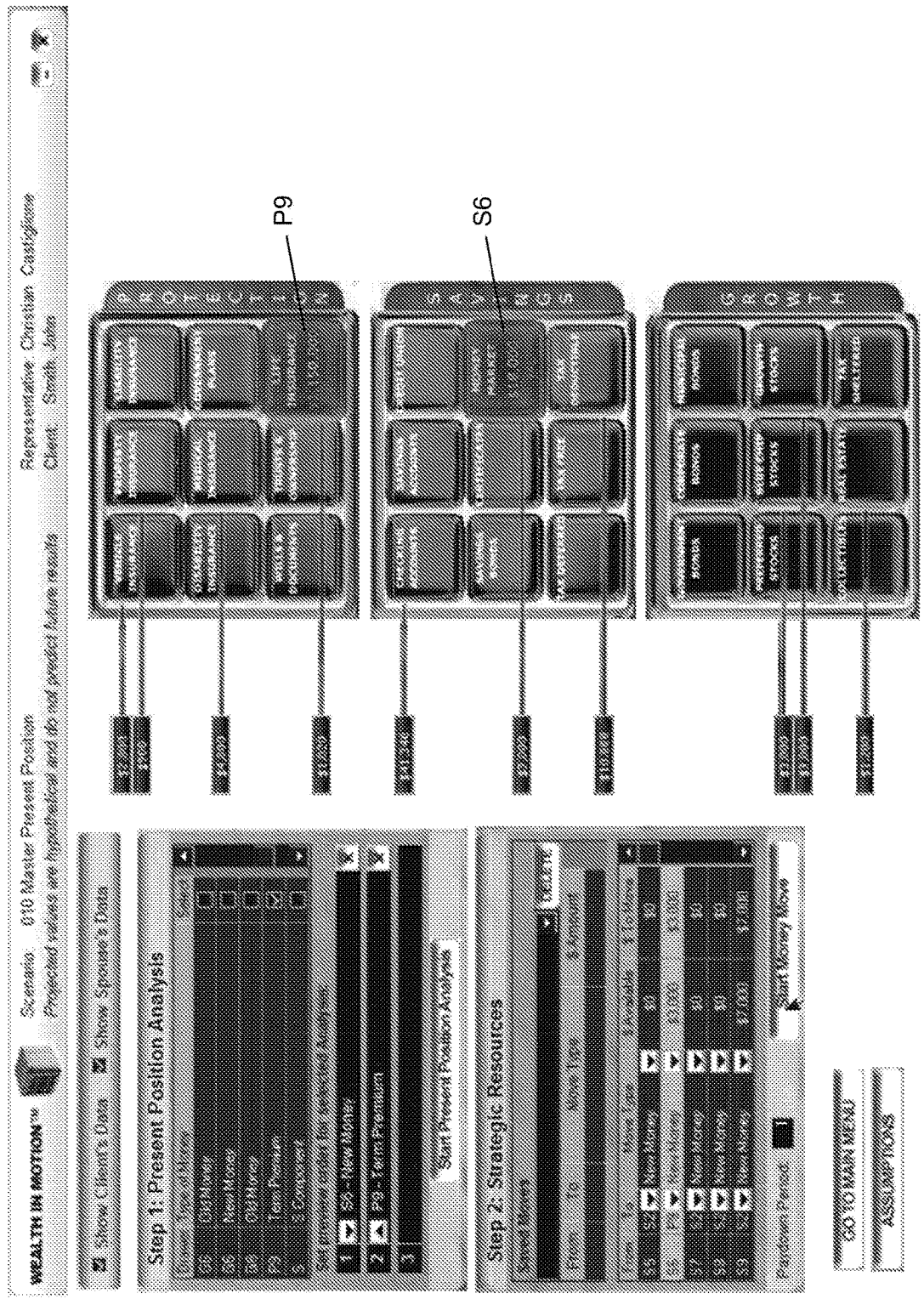
FIG. 9 illustrates setup of a simulation of a money move from a first sub-compartment to a second sub-compartment, according to an exemplary embodiment of the present invention.
Figure 10A:
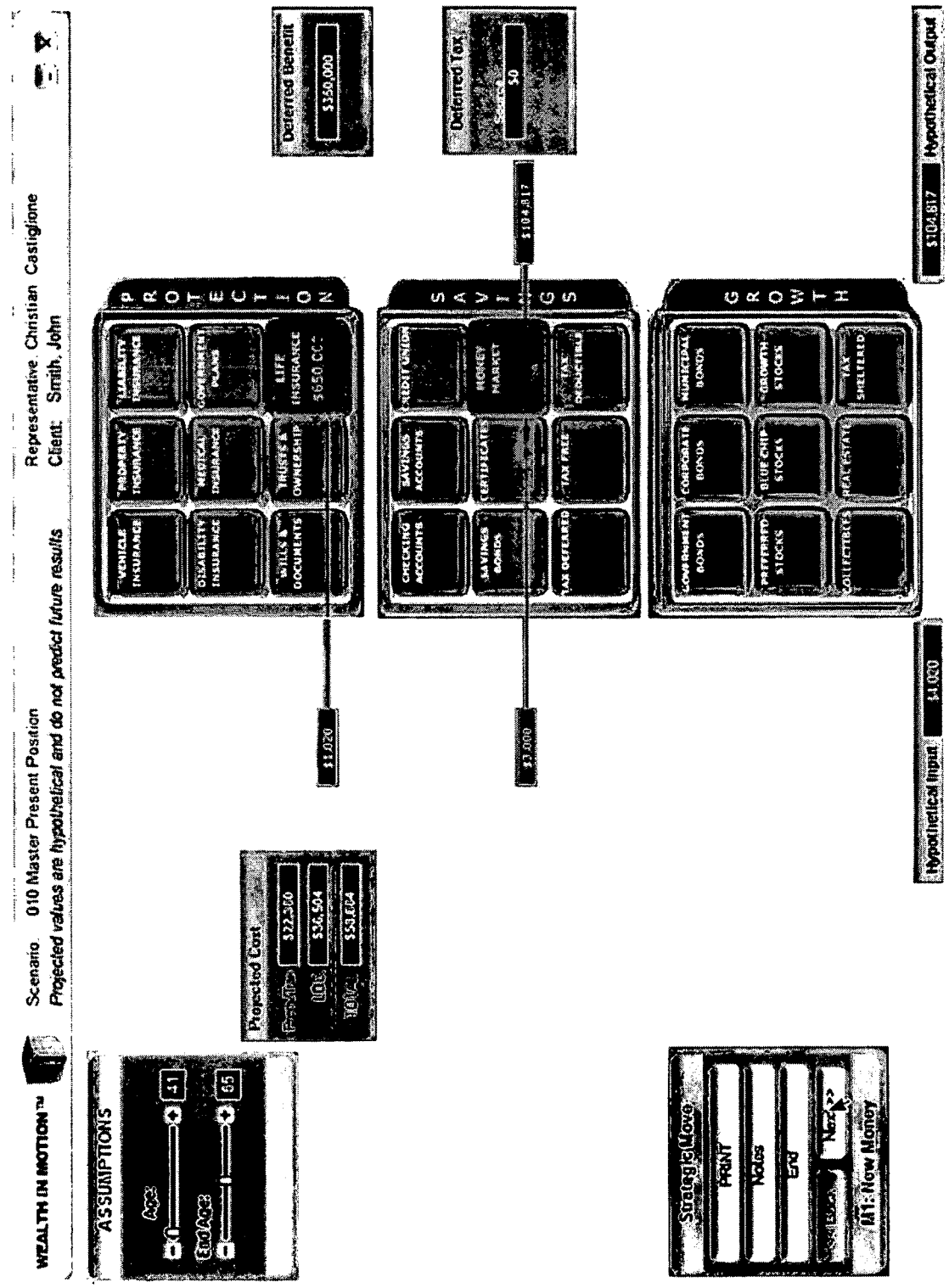

For example, as illustrated in FIG. 9, consider a move of funds from money markets S6 to life insurance P9. The user can initially select whether to move new money (i.e., input values 460), old money (i.e., current values 470), or both. In the example illustrated in FIG. 9, the user selects to move only new money. Before simulation of the move, the user can view the present position of the source and target sub-components, as illustrated in FIG. 10A. The present position for a new money simulation can preferably indicate input in the current year and output at a relevant end age, such an expected age of retirement or other age specified by the user.

Figure 10B:
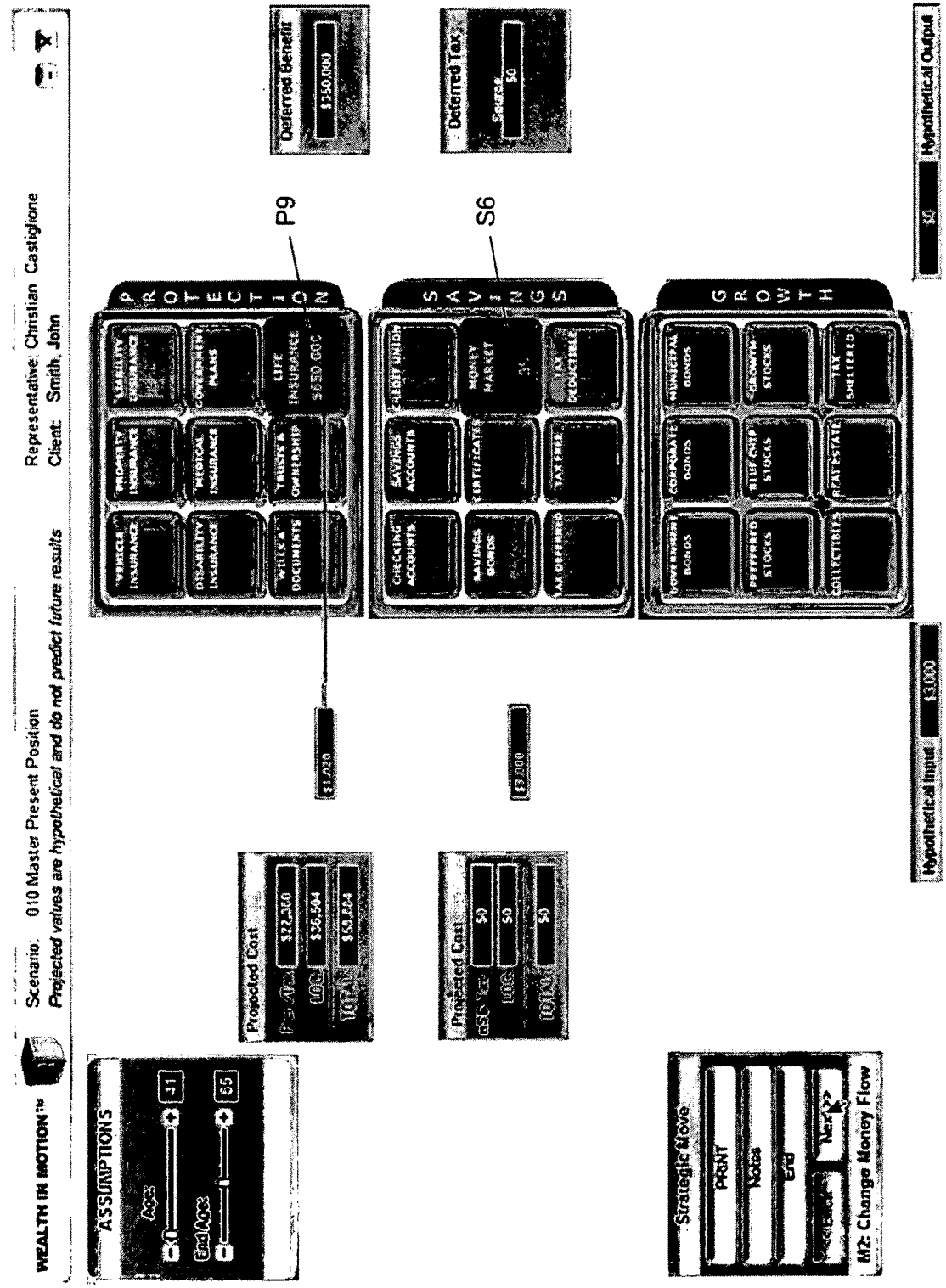
Figure 10C:
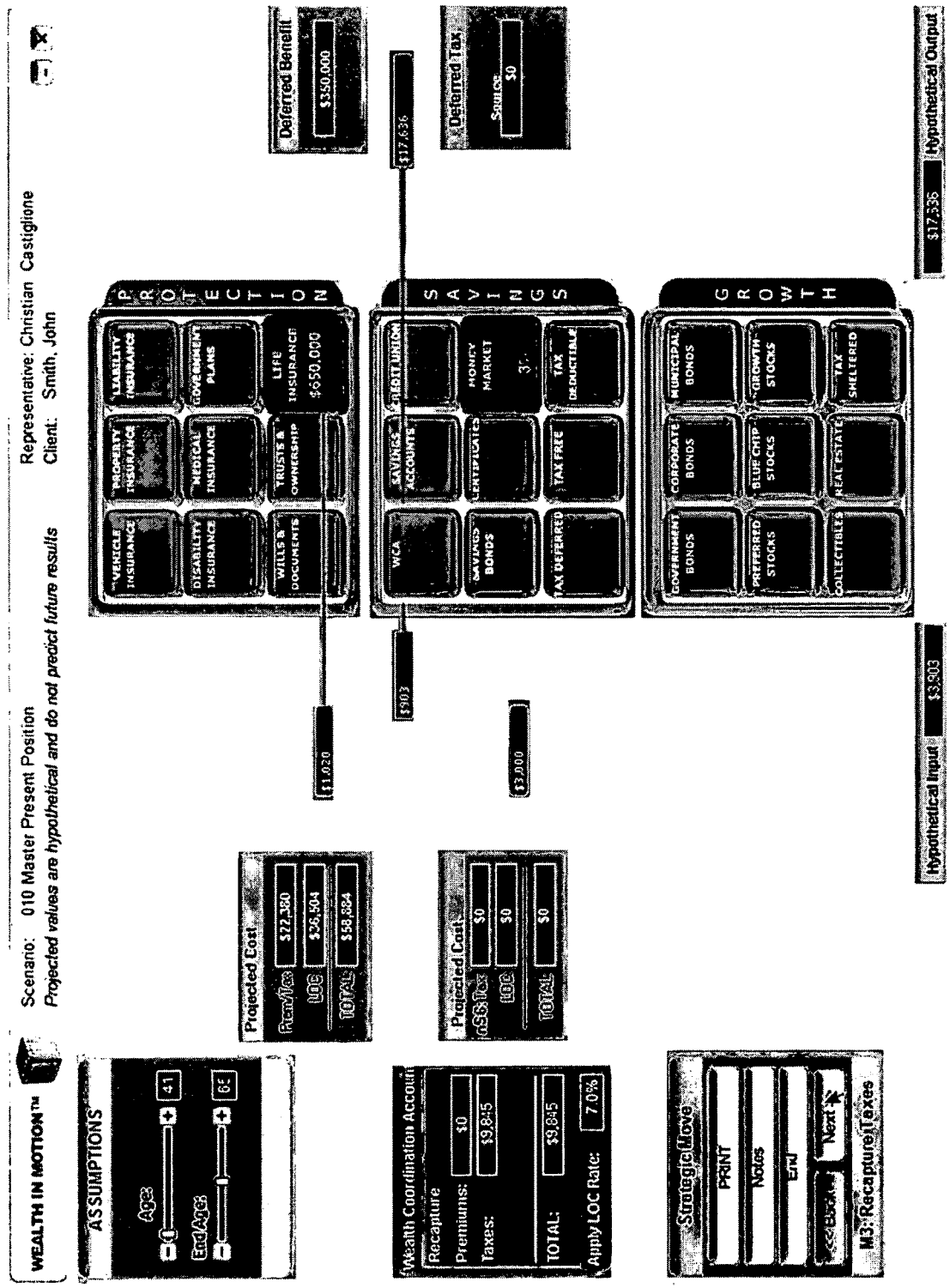
Figure 10D:
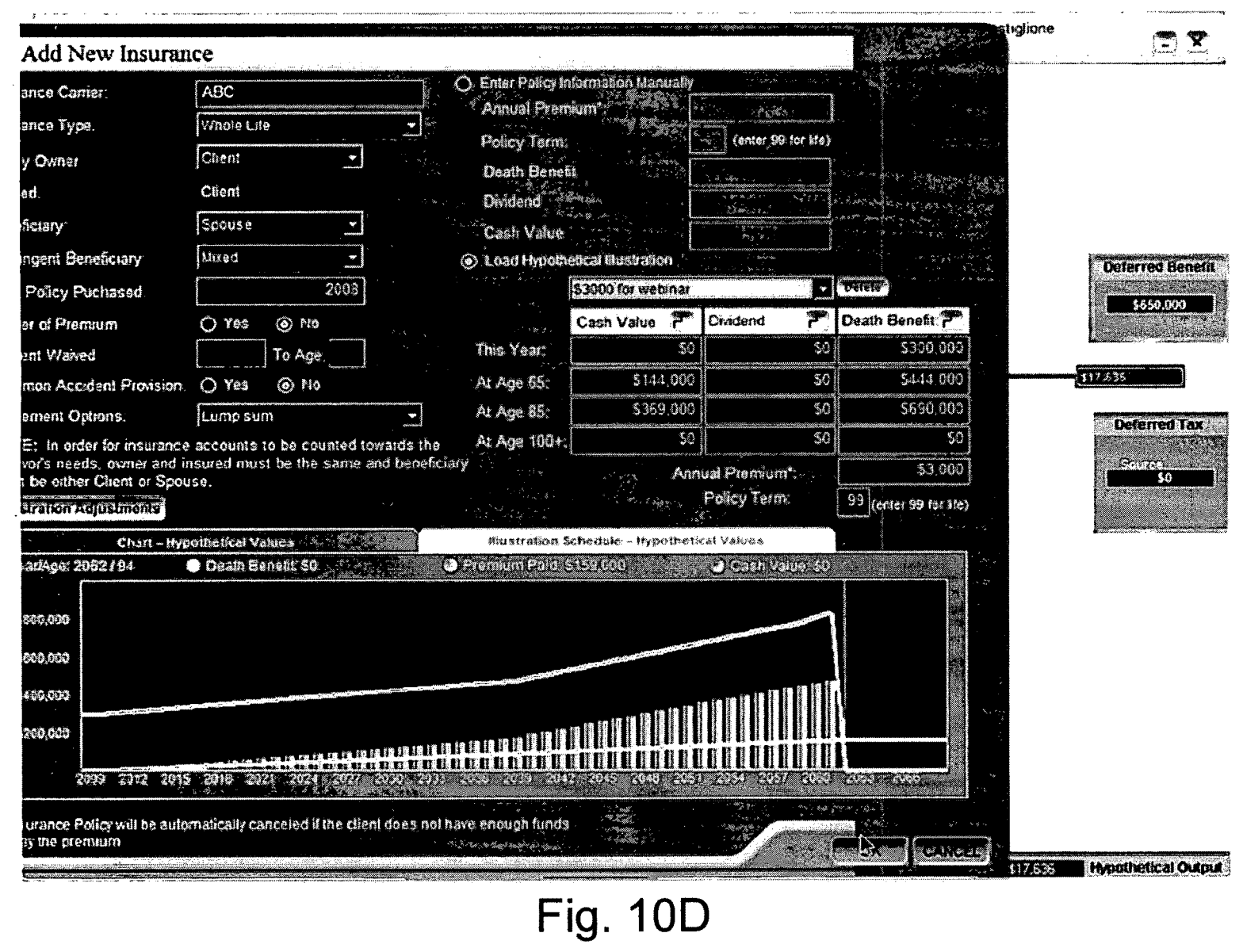
Figure 10E:
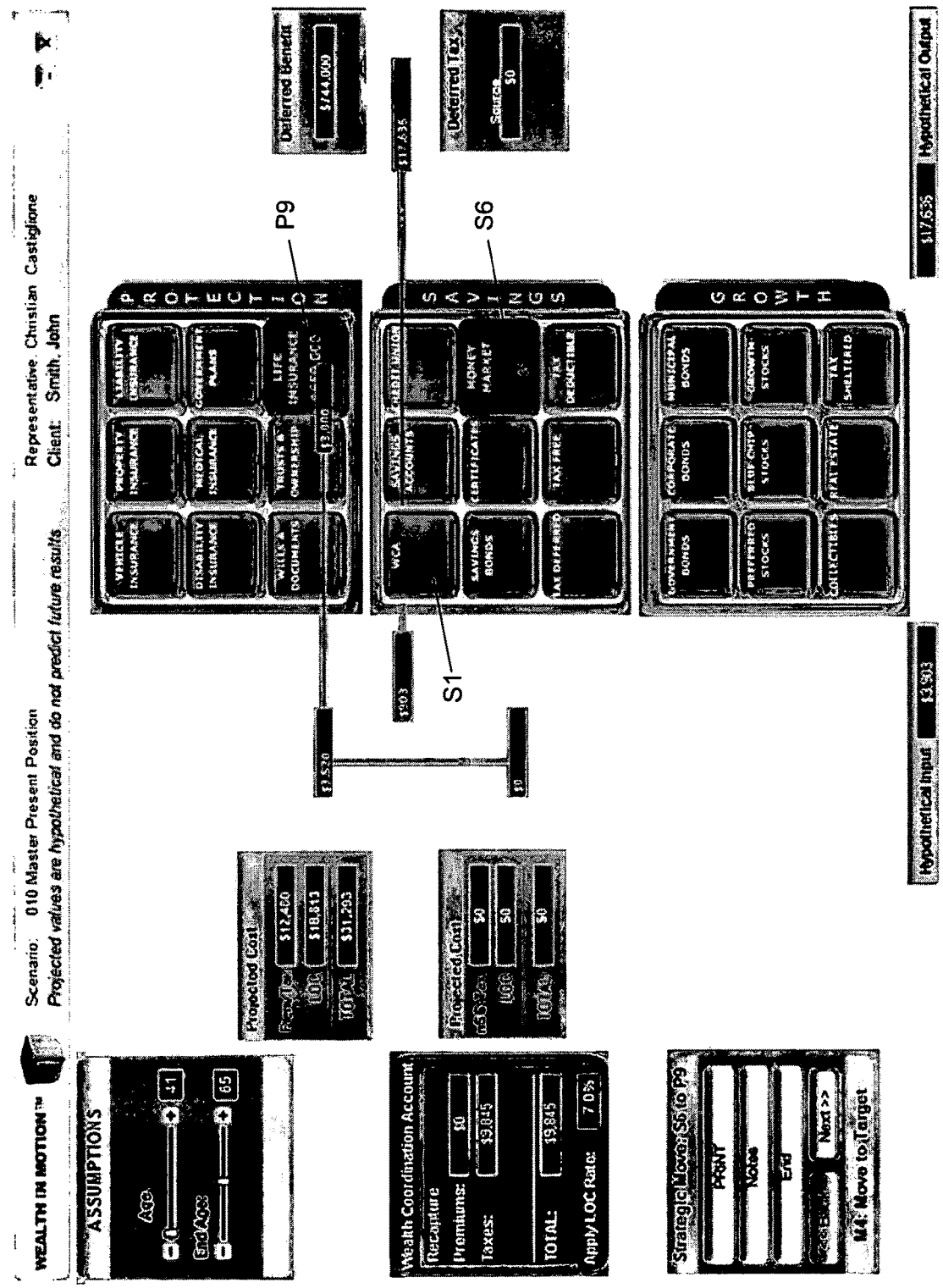
Figure 10F:
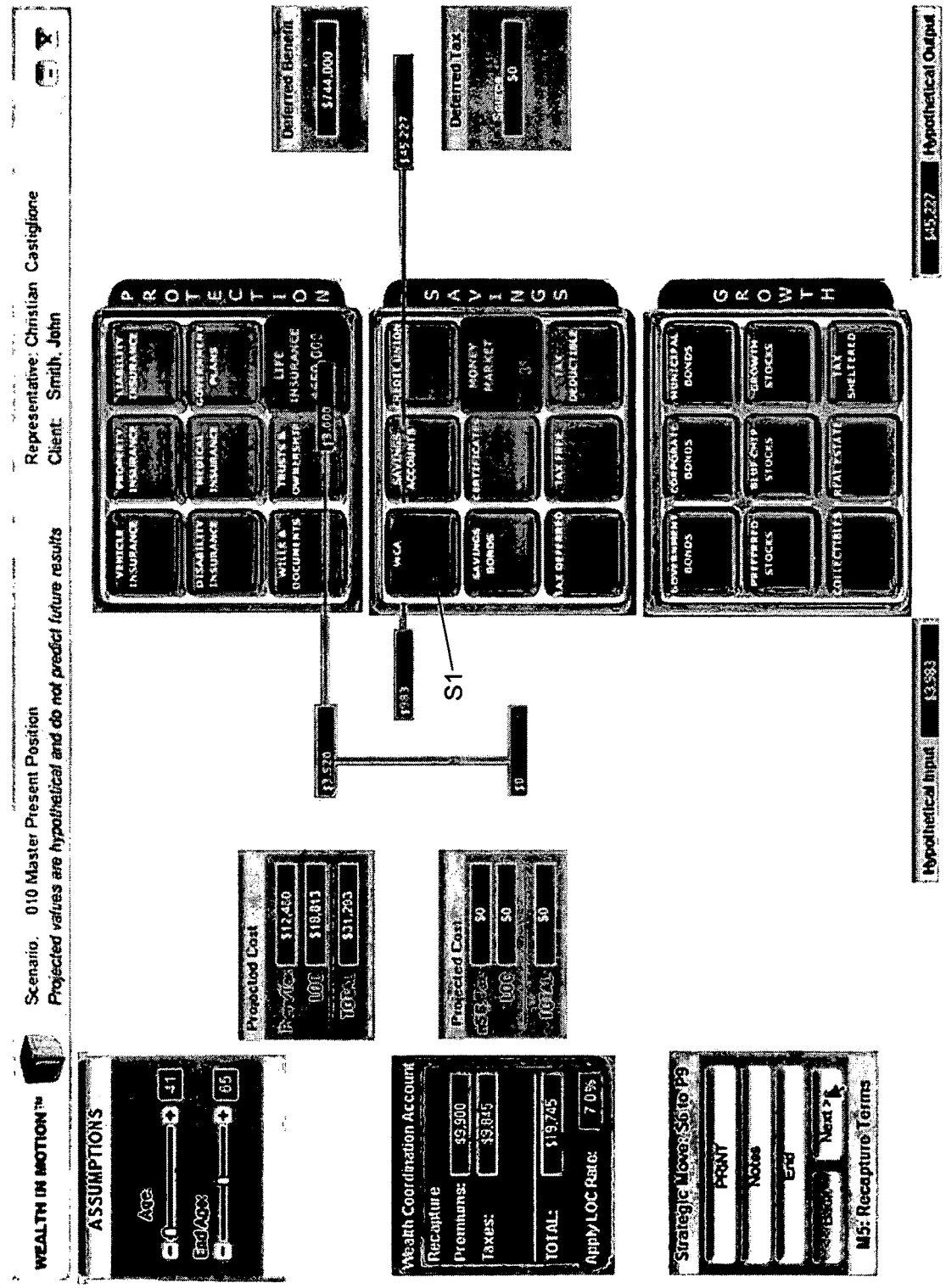
Figure 10G:
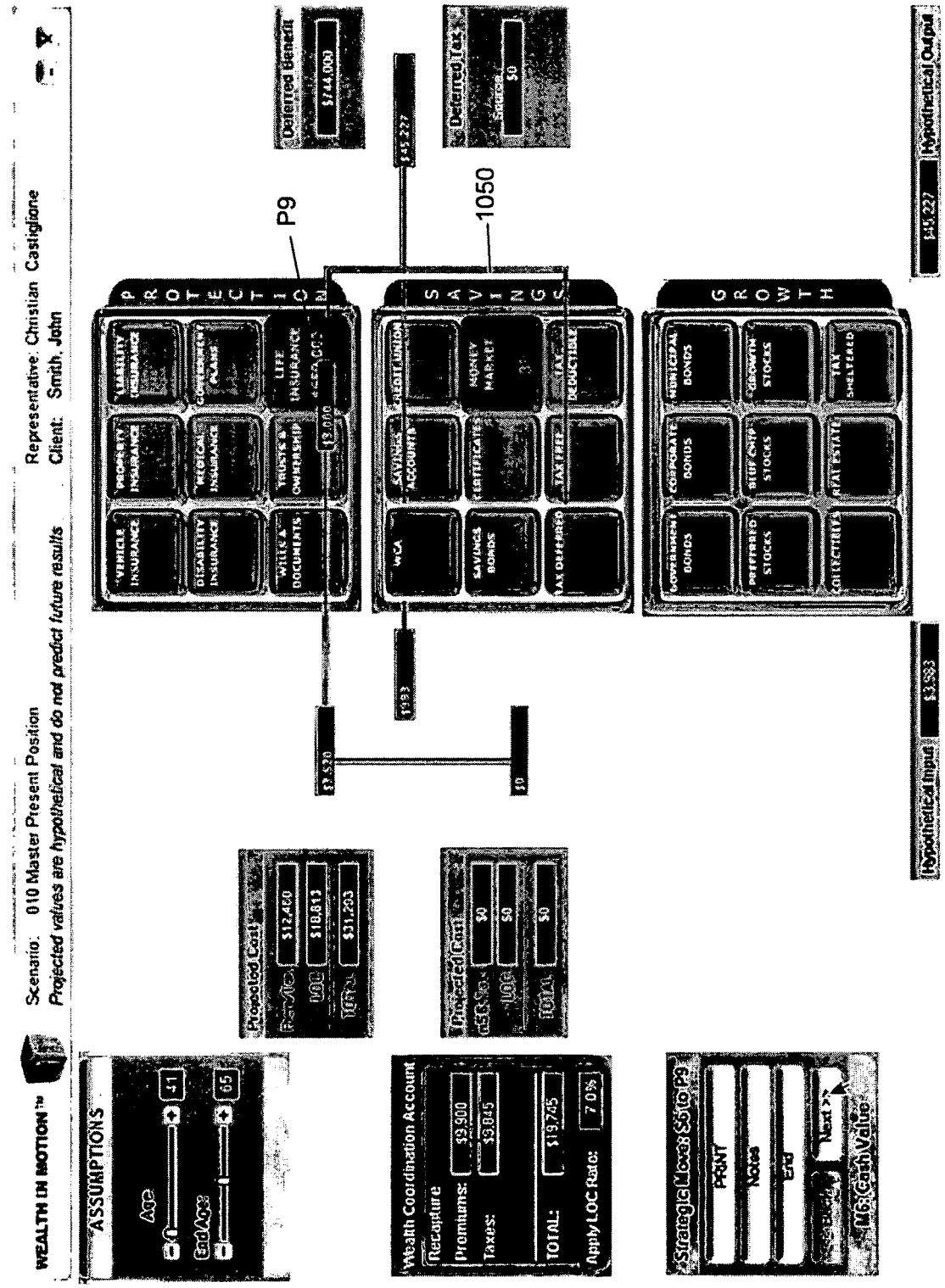
Figure 10H:
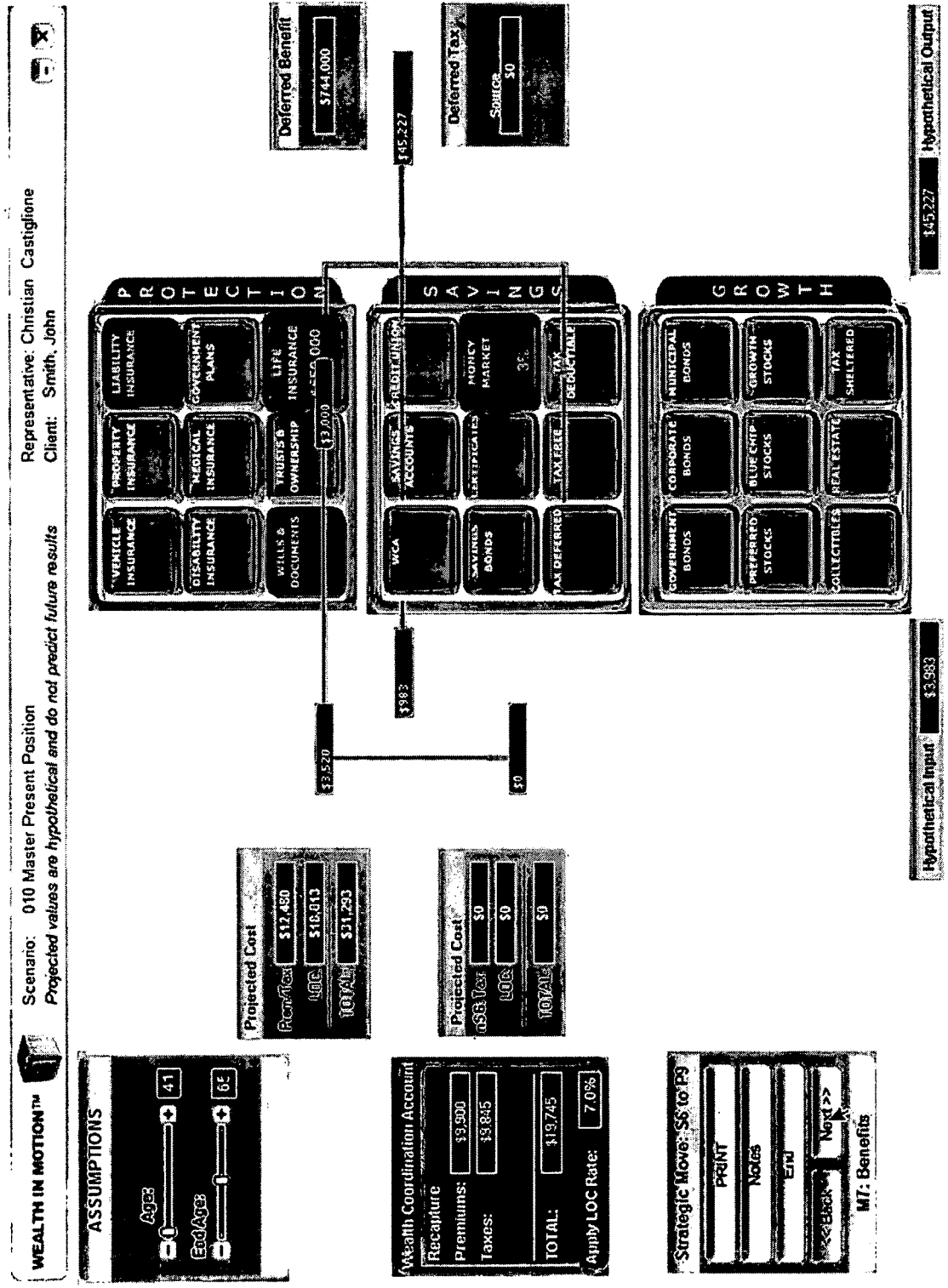
Figure 10I:
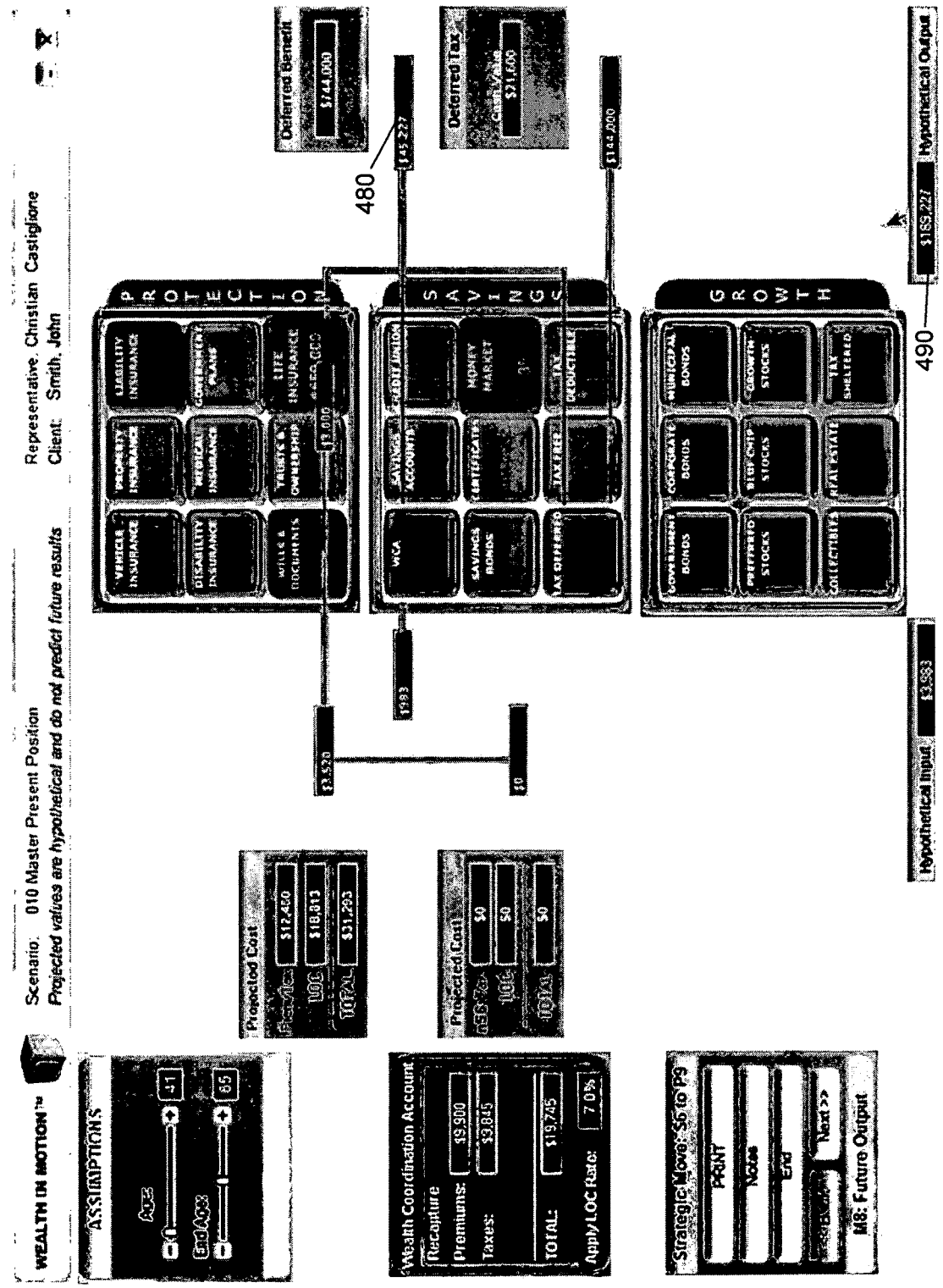
Figure 11:
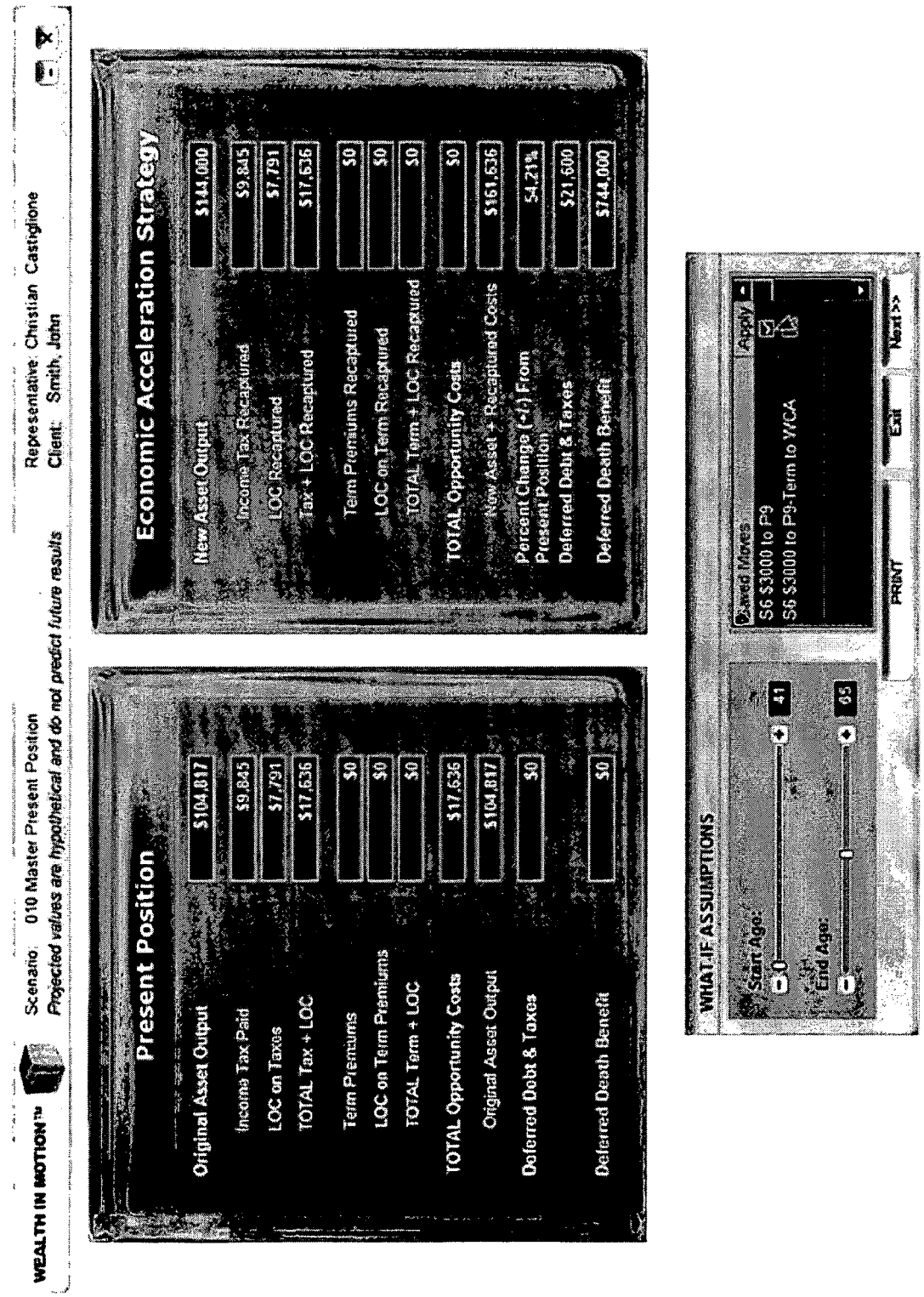
FIG. 11 illustrates a comparison of the entity's present position to the entity's hypothetical position after the money move, according to an exemplary embodiment of the present invention.

A first step of the move, as illustrated in FIG. 10B, can comprise terminating money input to the source sub-component. In this case, funds are no longer input to money markets S6. In a next step, as illustrated in FIG. 10D, the user can be prompted to enter details regarding the target account, which in this case is a whole life insurance account. For various target accounts, this step may not be necessary. In another step, as illustrated in FIG. 10E, funds previously contributed to money markets S6 can now be contributed to the target sub-component, a whole life insurance policy in sub-component P9. As shown, the move can result in additional cash flow, such as recapture of taxes. The additional cash flow can preferably be directed toward the first sub-component S1 of the savings component 420. In this case, this first sub-component is a wealth coordination account S1. In a next step, premiums from canceled term insurance can be recaptured into the wealth coordination account S1, as such term insurance is not needed in addition to the increased or new whole life insurance. An example of this recapturing is illustrated in FIG. 10F. Next, the simulation unit 260 can indicate that the target sub-component has a cash value. In this case, the target sub-component, whole life insurance P9, has a cash value because the entity can borrow against whole life insurance P9. As shown in FIG. 10G by a connector 1050, the cash value portion of the life insurance P9 is tax deferred, and may therefore be identified in the tax deferred sub-component S7. A benefit review can then be performed. In the benefit review, the simulation unit 260 can indicate one or more sub-components that may be modified or affected, or may otherwise require attention, because of the requested money move. Then, as illustrated in FIG. 10I, the simulation unit 260 can update the outputs 480 and 490 based on the move. Finally, as illustrated in FIG. 11, the simulation unit 260 can compare data values of the present position to data values resulting from the simulated money move.

As with a simulation of the entity's present position, the simulation unit 260 can progress from one step to a following step of a money move simulation when the user indicates a desire to continue. Such indication can comprise the user's clicking an appropriately labeled button or other object, or by providing an audible request to continue. Such button or other object may be labeled, for example, "NEXT," "FORWARD," or "CONTINUE." Alternatively, however, the simulation unit 260 can proceed to the following step after a predetermined time frame.

In an exemplary embodiment of the simulation unit 260, moving money to life insurance P9 can comprise more, or different, steps than moving money to a non-life insurance sub-component. Moving money to life insurance P9 can comprise all the steps of moving money to some other sub-component, in addition to one or more steps that may be unique to life insurance moves. For example, and not limitation, a money move to whole life insurance may comprise an additional steps of requesting, or otherwise providing, details regarding terms of the life insurance. Moving money to whole life insurance may also involve recovering insurance premiums from term insurance. One of ordinary skill in the art, however, will recognize that the number of steps used to simulate a money move are arbitrary to some degree, and can be based on a level of detail included in each step.

Various money moves may be simulated by the simulation unit 260. The above represents an exemplary simulation of moving new money from a first sub-component, specifically money markets S6, to a life insurance second sub-component. A general description of a new money move from a first sub-component to a life insurance sub-component P9 is provided below:

General Move from a First Sub-Component to a
Life Insurance Second Sub-Component 1. Show present position (i.e., before money move), including various combinations of the following: (a) present position of new money relating to first and second sub-components; (b) projected cost of the new money, including taxes and LOCs of paying the taxes; and (c) deferred benefits and deferred taxes.

2. Show termination or reduction of a flow of money into the first sub-component. Update projected costs, such as taxes and LOCs, to reflect that certain funds no longer flow into the first sub-component.

3. Show recapture of taxes no longer paid based on change to the first sub-component. Some or all of the recaptured taxes can now flow into S1, which can be a checking account or other wealth coordination account, or another savings sub-component. An output from S1 at an end age may be illustrated as well. Such output may represent a total savings from terminating or reducing money flow into the first sub-component. Accordingly, such output may be equivalent to the projected costs, which may have been illustrated in Step 1 above.

4. Provide new insurance, such as new whole life insurance. This step may comprise presenting the user with one or more prompts, dialogs, or data fields in which the user may enter details regarding the new life insurance. Additionally, if applicable, this step can also convert term insurance to whole life insurance. Because of the new or increased whole life insurance policy provided in the previous step, the entity may no longer need existing term insurance. In the this step, the user may be presented with one or more prompts, dialogs, or data fields to convert all or a portion of current term insurance to whole life insurance.

5. Show movement of terminated or reduced money flow, which was previously directed to the first sub-component, to the second sub-component. If applicable, dynamically update projected costs, deferred benefits, and deferred costs.

6. Show recapture of term insurance premiums if applicable. For example, if insurance payments are reduced or terminated based on the addition of new whole life insurance, newly available funds corresponding to such reduced premiums can flow into one or more savings sub-components, such as S1. Otherwise, if additional premiums are required for the new whole life insurance, show loss of cash flow corresponding to such premiums. Additionally, if applicable, this step may show LOCs resulting from having to pay such premiums. Update outputs from the applicable savings sub-components at the end age, to reflect a future increase or decrease of cash flows created from the change in term and/or whole life insurance premiums.

7. Indicate cash value of changes to the target sub-component. For example, a connector, such as the connector 1050, can link the target sub-component to a sub-component having a cash value.

8. Show benefit review. For example, emphasize one or more sub-components that may be affected by the money movement. Such emphasis can comprise, for example, changing coloration or other appearance of the one or more sub-components.

9. Show future output of money move at end age. For example, in Step 8, it was indicated that whole life insurance P9 had a cash value. This step may show the future value of such cash value at the end age.

An exemplary simulation of moving new money from a first sub-component to a non-life insurance sub-component is outlined below. As shown, such a move may involve fewer steps to simulate than involved in a move to a life insurance sub-component.

General Move from a First Sub-Component to a Non-Life Insurance Second Sub-Component 1. Show present position (i.e., before money move), including various combinations of the following: (a) present position of new money relating to first and second sub-components; (b) projected cost of the new money, including taxes and LOCs of paying the taxes; and (c) deferred benefits and deferred taxes.

2. Show termination or reduction of a flow of money into the first sub-component. Update projected costs, such as taxes and LOCs, to reflect that certain funds no longer flow into the first sub-component.

3. Show recapture of taxes no longer paid based on change to the first sub-component. Some or all of the recaptured taxes can now flow into S1, which can be a checking account or other wealth coordination account, or another sub-component of the savings component. An output from the savings sub-component at the end age may be illustrated as well. Such output may represent a total savings from terminating or reducing money flow into the first sub-component. Accordingly, such output may be equivalent to the projected costs, which may have been illustrated in Step 1 above.

Figure 12A:
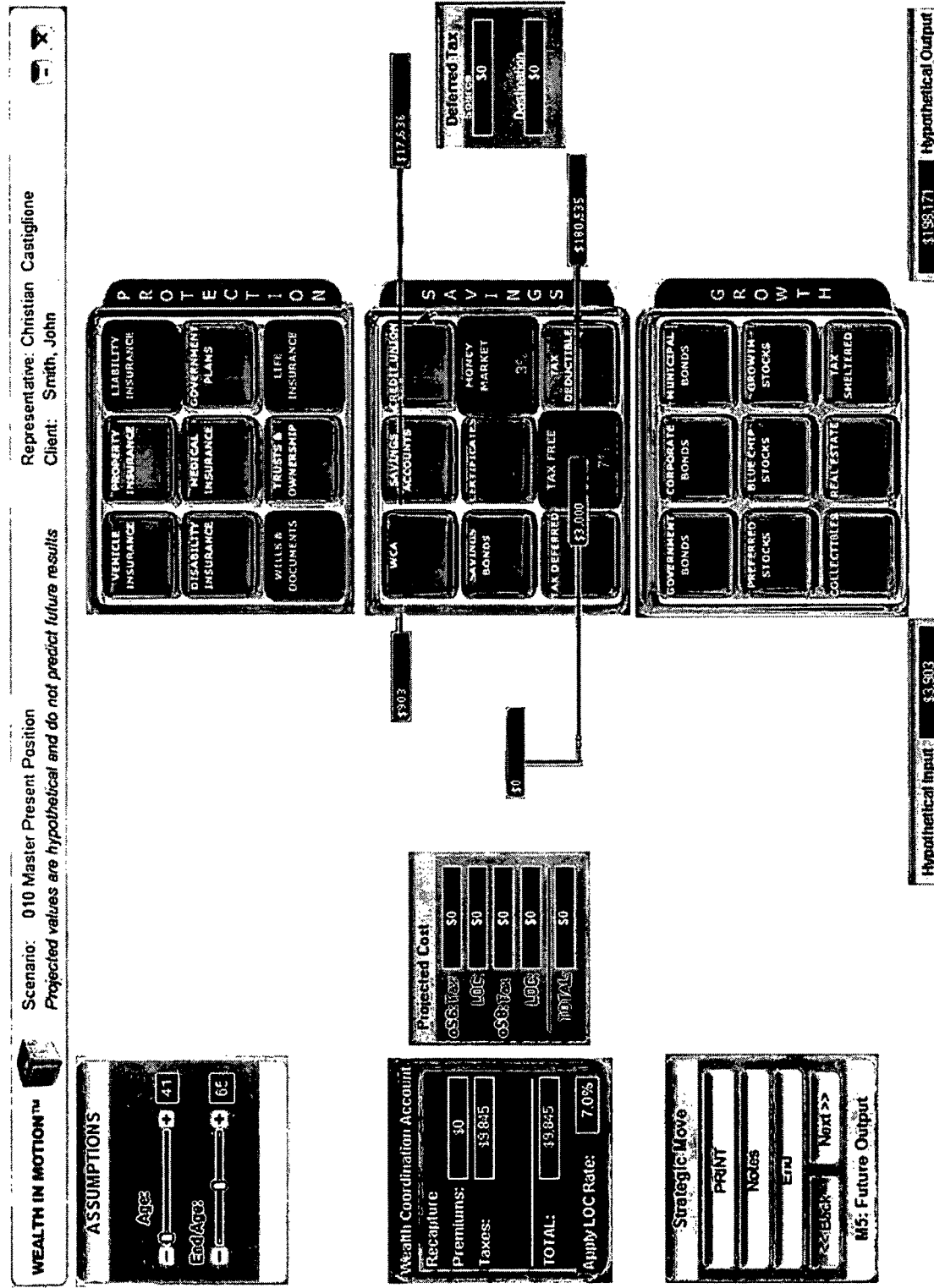
FIGS. 12A-12B illustrate selected steps of a second money move, according to an exemplary embodiment of the present invention.

4. Show movement of terminated or reduced money flow, which was previously directed to the first sub-component, to the second sub-component. If applicable, dynamically update projected costs, deferred benefits, and deferred costs. For example, FIG. 12A illustrates money movement for a move from money markets S6 to a tax-free IRA S8.

Figure 12B:
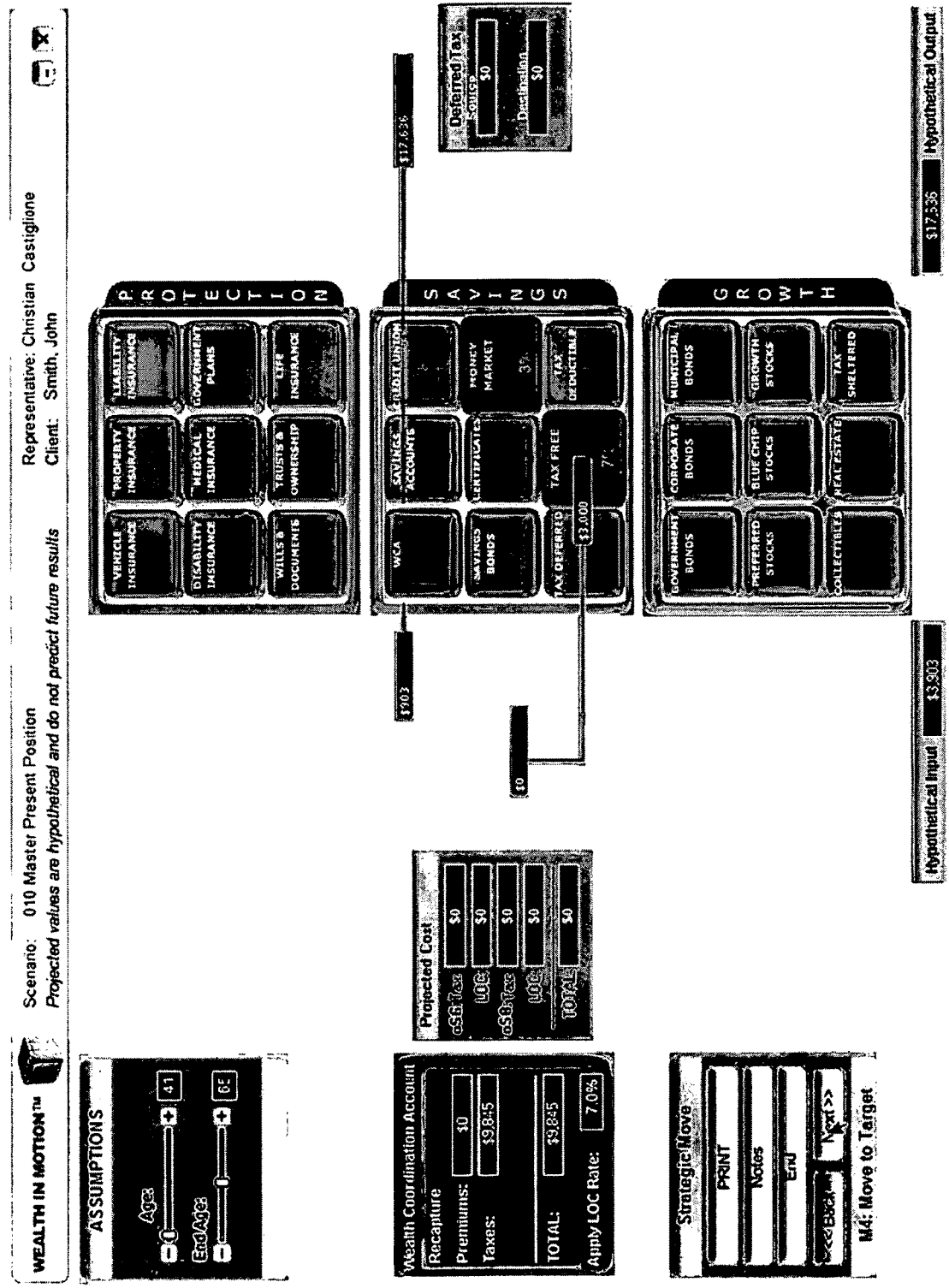

5. Show future output of money move at end age. For example, 12B illustrates future output based on the money move illustrated in FIG. 12A, from money markets S6 to a tax-free IRA S8. In this step or in an additional step, the simulation unit can also conduct a benefit review similar to that conducted in Step 8 of the move to a life insurance sub-component. As shown in FIG. 12B, one or more sub-components may be emphasized to illustrate that they may be affected by the move.

While the above steps describe moves of new money, one of skill in the art will recognize that moving old money, or a combination of old and new money, may comprise similar simulation steps as those outlined above. One of ordinary skill in the art will further recognize that various sets of the above described steps can be combined into single steps. Additionally, single steps, as described above, can be separated into two or more steps. One or more steps may be added to or removed from the above-described simulations to effectively illustrate a move of money from a first financial product to a second financial product. Further, multiple moves may be collectively set up and simultaneously simulated as either a single simulation or a series of consecutive simulations.

Various money moves, which may or may not follow the above patterns, can be simulated by the simulation unit 260. Such moves may generally comprise moving money from a first sub-component to a second sub-component. The first and the second sub-components may be selected from the entire set of sub-components belonging to all components.

Accordingly, the simulation unit 260 can model and simulate the entity's present and potential future positions.

E. Strategy Unit 270

The strategy unit 270 can define one or more predetermined strategies for allocating wealth in a manner deemed to optimal or beneficial. Predefined strategies of the strategy unit 270 can be simulated by the simulation unit 260 upon request of a user. In an exemplary embodiment of the financial modeling system 200, the strategy unit 270 defines a "preferred" strategy based on comprehensive financial research. The preferred strategy may aim to achieve one or more of the following:

Maximize all, or most of, the protection sub-components.

Save at least fifteen percent of gross annual income.

Retain at least fifty percent of gross annual income in the savings component 420, preferably in the first seven sub-components.

Contribute earnings from the first six sub-components of the savings component 420 back into the first sub-component of the savings component 420 (e.g., checking account).

Begin qualified plan contributions (level three of the savings component 420) only after the above bulleted goals have been met.

Maximize matching contributions of qualified plan contributions.

Initially, contribute no more than seven percent of gross annual income to qualified plans.

Make additional qualified plan contributions above seven percent of gross annual income only after all other goals have been met at least once.

Overflow can be an important concept in balancing a financial model according to the above preferred strategy. Preferably, overflow from the savings component 420 can be moved into the first row of the growth component 430. Earnings and interest from the savings component 420, as well as overflow from the first row of the growth component 430, can optionally be invested into the second row of the growth component 430. Such overflow into the second row of the growth component 430 can continue until the second row equals the total value in the first row of the growth component 430. When the second row equals the first row, additional overflow can then be contributed to the third row of the growth component 430. As a result, riskier investments are undertaken in this strategy only when more predictable investments have already been made. Alternatively, overflow may be deposited into qualified plans to raise the total allocation in qualified plans beyond seven percent of the gross annual income. Further alternatively, interest, dividends, realized capital gains, and rents in the growth component 430 can be deposited into the first sub-component of the savings component 410 instead of being automatically reinvested.

For example, suppose an entity has an annual income of $100,000. According to the above strategy, the entity should save at least $15,000 per year and have at least $50,000 in the savings component 420. As the entity continues to increase his salary, both the current values 470 amount in the savings component 420 and the annual amount contributed to the savings component 420 increase each year.

If the entity has saved at least $50,000 by the third year, and has $15,000 to overflow into the growth component 430, the entity then has the following options:

The entity can choose to put $5,000 into each level of the growth component 430.

The entity can choose to put all $15,000 into the first level of the growth component 430, and can plan to eventually put $15,000 into each of the other growth component 430 levels.

Alternatively, the entity can put $10,000 into the first level of the growth component 430 and $5000 into the second level. The entity can plan to build up the second and third levels of the growth component 430 to $10,000 to match the first level put $5,000 into level tier two as a start toward balancing level tier two. Each of these options sets up a particular rebalancing plan.

If the above preferred strategy is undertaken, values in the various sub-components can be periodically simulated and reviewed to identify deficiencies. Financial recommendations can be made as to where to reposition funds, particularly finds in the first savings sub-component. Repositioning can be determined to meet the afore-mentioned goals of the preferred strategy. If there is a decline or loss of money in any particular sub-component or set of sub-components, the user and/or the entity can determine a cause of the decline, and can rebalance the model.

The above strategy can enable the entity to achieve various combinations of the following tasks: save income taxes, maintain liquidity, reduce risk, maximize protection, optimize earnings, achieve money efficiency, enjoy a multiplier effect based on the velocity of money theory, assess current events, make more intelligent financial decisions, avoid lost opportunity costs, and generally maintain a balanced and beneficial financial position.

Alternatively, the user may define the limits within each of the steps identified within the strategy unit 270. User-defined limits may constitute one or more additional strategies of the strategy unit 270. The simulation unit 260 may engage the user-defined limits and perform a simulation of the results, which may be compared against results simulated based on the preferred strategy.

III. Conclusion

Accordingly, as described above, the financial modeling system 200 and methods can be utilized to effectively and graphically model an entity's financial position and net worth. The system 200 and method can be further utilized to illustrate benefits and drawback of various financial decisions.

While the financial modeling system 200 and associated methods have been disclosed in exemplary forms, it will be apparent to those skilled in the art that many modifications, additions, and deletions may be made without departing from the spirit and scope of the system, method, and their equivalents, as set forth in the following claims.

The invention claimed is:

1. A method comprising:
receiving, at a computing device, financial data relating to an entity;
categorizing, by the computing device, the financial data into a plurality of financial components, the plurality of financial components including at least a savings component and a growth component;
responsive to analyzing the financial data and a set of assumptions, creating, by the computing device, a financial model based on the plurality of financial components;
dividing, by the computing device, the growth component into a plurality of sub-components;
outputting, for display, a graphical representation of the sub-components associated with the growth component, each respective sub-component of the growth component being represented in a respective cell of a grid, the grid having a plurality of rows and a plurality of columns, and the graphical representations of the sub-components associated with the growth component being arranged inside the grid according to a predetermined hierarchical pattern comprising a first level corresponding to one or more first investment types and a second level corresponding to one or more second investment types;
responsive to receiving an update to the financial data and the set of assumptions, outputting, for display, a dynamically updated graphical representation of the financial model based on the received update, the dynamically updated graphical representation of the financial model simulating a move of funds by (i) graphically depicting removing a value of the funds from a first displayed sub-component and (ii) graphically depicting moving the value of the funds between the first displayed sub-component and a second displayed sub-component;
responsive to determining, by the computing device and based on the updated financial data and the updated set of assumptions, that a savings target associated with the savings component has been met, illustrating application of overflow funds to the growth component, the overflow funds being savings funds in excess of the savings target;

simulate a plurality of scenarios, each scenario of the plurality of scenarios including a distribution of overflow funds between the first and second levels of the growth component; and output, based on the plurality of scenarios, a recommendation corresponding to a suggested distribution of the overflow funds between the first and second levels.

2. The method of claim 1, wherein the first level corresponds to a first row of the grid and the second level corresponds to a second row of the grid.

3. The method of claim 1, wherein the hierarchical pattern further comprises a third level corresponding to one or more third investment types, and wherein each scenario of the plurality of scenarios includes a distribution of overflow funds among the first, second, and third levels of the growth component.

4. The method of claim 1 further comprising periodically simulating the plurality of scenarios.

5. The method of claim 1, wherein a scenario of the plurality of scenarios includes applying an equal sum of overflow funds to each level of the growth component.

6. The method of claim 1, wherein a scenario of the plurality of scenarios includes applying the overflow funds to the first level of the growth component until a first level target amount is reached and, subsequent to reaching the first level target amount, applying any remaining overflow funds to the second level of the growth component.

7. The method of claim 1 further comprising outputting, for display, one or more dollar values corresponding to a sub-component from the plurality of sub-components associated with at least one financial component of the plurality of financial components.

8. The method of claim 1, wherein the predetermined hierarchical pattern is further based on at least one of a degree of risk associated with each sub-component, a liquidity associated with each sub-component, and a productivity associated with each sub-component.

9. The method of claim 1, wherein the plurality of financial components includes a protection component corresponding to funds used to protect the entity's wealth.

10. The method of claim 1, wherein the savings component corresponds to funds that are saved.

11. The method of claim 1, wherein the growth component corresponds to funds expected to grow.

12. The method of claim 1, wherein the plurality of financial components includes a debt component corresponding to liabilities of the entity.

13. The method of claim 1, the displayed sub-components being color-coded to indicate a status with respect to one or more financial benchmarks.

14. The method of claim 1, wherein the grid of the plurality of sub-components, inside the graphical representation of the first component, comprises at least two dimensions.

15. The method of claim 14 further comprising determining, by a processor, one or more input values based on a user's responses.

16. The method of claim 14 further comprising calculating, by a processor, one or more output values corresponding to financial outputs in a user specified future year.

17. The method of claim 1, wherein the predetermined hierarchical pattern is based at least in part on a number of functions associated with each respective sub-component, the functions including protection of assets, protection of income, and protections from consequences of death.

18. The method of claim 1, wherein the predetermined hierarchical pattern is based at least in part on a number of functions associated with each respective sub-component, the functions including providing a safety net, high yields, and tax benefits.

19. The method of claim 18 further comprising applying, by a processor, an inflation rate to the output values to generate a present value of the output values.

20. A method for modeling financial data, the method comprising:

receiving, at a processor, a user's responses to a financial questionnaire;

automatically importing, by the processor, the user's responses to the financial questionnaire into a financial model, the financial model having a plurality of financial components, including at least two distinct and explicitly identified financial components;

receiving, by the processor, a set of assumptions relating to the financial model;

dividing, by the processor, each of the plurality of financial components into a respective plurality of sub-components;

for at least one of the plurality of financial components, outputting, by the processor and for display, a graphical representation of the plurality of sub-components associated with a respective financial component, each respective sub-component of the associated plurality of sub-components being represented in a respective cell of a grid, wherein the grid has a plurality of rows and a plurality of columns, wherein the graphical representations of the associated plurality of sub-components are arranged inside the grid according to a predetermined hierarchical pattern, and wherein the graphical representations of the associated plurality of sub-components are color-coded according to a predetermined scheme wherein, for a benchmark associated with a particular respective sub-component, a first color indicates that that the particular respective sub-component passed the benchmark, a second color indicates that the particular respective sub-component received borderline results for the benchmark, and a third color indicates that the particular respective sub-component failed the benchmark;

responsive to receiving, at the processor, an update to the user's responses and the set of assumptions, outputting, by the processor and for display, a dynamically updated graphical representation of the financial model based on the received update, the dynamically updated graphical representation of the financial model including simulating a move of funds;

responsive to determining, based on the updated user's responses and the updated set of assumptions, that a financial target associated a first financial component of the at least two distinct and explicitly identified financial components has been met, illustrating application of overflow funds to a second financial component of the at least two distinct and explicitly identified financial components, the overflow funds being funds associated with the financial target that are in excess of the financial target;

simulate a plurality of scenarios, each scenario of the plurality of scenarios including a distribution of overflow funds between a first hierarchical level of the predetermined hierarchical pattern for the second financial component and a second hierarchical level of the predetermined hierarchical pattern for the second financial component; and output, based on the plurality of scenarios, a recommendation corresponding to a suggested distribution of the overflow funds between the first and second hierarchical levels.

* * * * *